(12) United States Patent
Passot

(10) Patent No.: US 11,886,198 B2
(45) Date of Patent: Jan. 30, 2024

(54) SYSTEMS AND METHODS FOR DETECTING BLIND SPOTS FOR ROBOTS

(71) Applicant: Brain Corporation, San Diego, CA (US)

(72) Inventor: Jean-Baptiste Passot, San Diego, CA (US)

(73) Assignee: Brain Corporation, San Diego, CA (US)

( * ) Notice: Subject to any disclaimer, the term of this patent is extended or adjusted under 35 U.S.C. 154(b) by 413 days.

(21) Appl. No.: 17/199,721

(22) Filed: Mar. 12, 2021

(65) Prior Publication Data

US 2021/0197383 A1 Jul. 1, 2021

Related U.S. Application Data

(63) Continuation of application No. PCT/US2019/050774, filed on Sep. 12, 2019.

(60) Provisional application No. 62/730,174, filed on Sep. 12, 2018.

(51) Int. Cl.
*G05D 1/02* (2020.01)
*G06V 10/42* (2022.01)
*G06V 20/10* (2022.01)
*G06V 20/58* (2022.01)
*B25J 9/16* (2006.01)
*B25J 19/06* (2006.01)

(52) U.S. Cl.
CPC ............ *G05D 1/024* (2013.01); *B25J 9/1671* (2013.01); *B25J 9/1676* (2013.01); *B25J 19/061* (2013.01); *G06V 10/421* (2022.01); *G06V 20/10* (2022.01); *G06V 20/58* (2022.01)

(58) Field of Classification Search
None
See application file for complete search history.

(56) References Cited

U.S. PATENT DOCUMENTS

2012/0035797 A1 2/2012 Oobayashi et al.
2016/0375592 A1 12/2016 Szatmary et al.
(Continued)

FOREIGN PATENT DOCUMENTS

EP 3570063 A1 * 11/2019 ............ G06F 9/455

OTHER PUBLICATIONS

International Search Report and Written Opinion dated Nov. 29, 2019 for PCT/US19/50774.
(Continued)

*Primary Examiner* — Jeff A Burke
*Assistant Examiner* — Arslan Azhar
(74) *Attorney, Agent, or Firm* — Reed Smith LLP; Sidharth Kapoor

(57) ABSTRACT

Systems and methods for detecting blind spots using a robotic apparatus are disclosed herein. According to at least one exemplary embodiment, a robot may utilize a plurality of virtual robots or representations to determine intersection points between extended measurements from the robot and virtual measurements from a respective one of the virtual robot or representation to determine blind spots. The robot may additionally consider locations of the blind spots while navigating a route to enhance safety, wherein the robot may perform an action to alert nearby humans upon navigating near a blind spot along the route.

15 Claims, 12 Drawing Sheets

(56) References Cited

U.S. PATENT DOCUMENTS

2017/0371338 A1 12/2017 Kamata et al.
2018/0059248 A1 3/2018 O'Keeffe

OTHER PUBLICATIONS

Supplementary European Search Report and European Search Opinion dated Apr. 21, 2022 for EP Application No. 19858731.3.

* cited by examiner

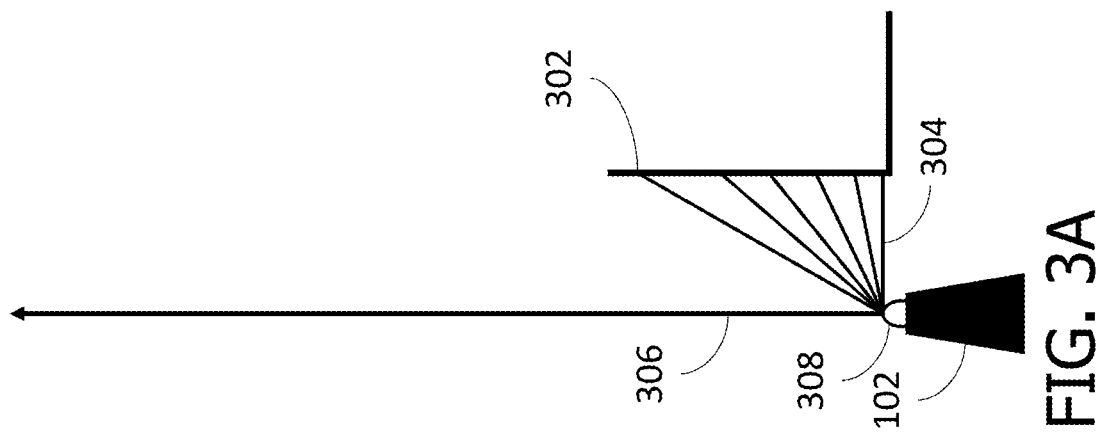

SYSTEMS AND METHODS FOR DETECTING BLIND SPOTS FOR ROBOTS

PRIORITY

This application is a continuation of International Patent Application No. PCT/US19/50774 filed Sep. 12, 2019 and claims the benefit of U.S. Provisional Patent Application Ser. No. 62/730,174 filed on Sep. 12, 2018 under 35 U.S.C. § 119, the entire disclosure of each are incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to robotics and, more specifically, to systems and methods for detecting blind spots for a robotic apparatus.

SUMMARY

Currently, robots may operate in environments comprising a plurality of obstacles. These obstacles may create blind spots comprising regions beyond the obstacles which robots cannot observe using their sensors. Robots navigating near blind spots may create safety risks for the robots themselves and nearby humans within the blind spots.

For example, a robot may operate within a store to clean floors within aisles of the store. As the robot approaches ends of an aisle, the robot may be unable to observe humans walking perpendicular to the aisles beyond shelves of the aisles. The robot may, upon exiting an aisle, pose a risk for humans walking nearby the aisle as the robot may be unable to detect the humans using its sensors.

Blind spots may be observed as a robot navigates nearby any object, wherein a robot which is unable to determine a blind spot may pose a safety risk to itself and nearby humans. Accordingly, systems and methods of the present disclosure may enable robots to detect blind spots and perform actions to enhance safety when operating within complex environments.

The foregoing needs are satisfied by the present disclosure, which provides for, inter alia, systems, apparatuses, and methods for detecting blind spots using a robotic apparatus.

Exemplary embodiments described herein have innovative features, no single one of which is indispensable or solely responsible for their desirable attributes. Without limiting the scope of the claims, some of the advantageous features will now be summarized.

According to at least one non-limiting exemplary embodiment, a system is disclosed. The system may be a robotic system which may comprise at least one sensor unit, a non-transitory computer readable storage medium comprising a plurality of specialized instructions and algorithms embodied thereon, and a controller including a processor configured to execute the instructions and algorithms to detect blind spots by determining intersections between extended measurement beams and virtual measurements from one or more virtual robots upon detecting an object. One of ordinary skill in the art may appreciate that virtual robots may correspond to one or more virtual projections, one or more virtual objects, one or more virtual correspondences, one or more virtual representations, one or more virtual instances, or one or more virtual indicia. Executing such specialized instructions and algorithms may result or configure the processor to act in a specialized manner. The one or more virtual robots and virtual measurements comprising simulated robots and measurements, respectively, performed on a computer readable map of an environment based on current localization data of the object; and determine a blind spot based on locations of the intersections. The processor may be further configured to execute the specialized instructions to cause the robot to perform a safety action upon reaching a predetermined distance from a blind spot along a route, the safety action comprising emitting an auditory noise, reducing speed of the robot, and/or producing a visual indication to alert nearby humans, whom may possibly be within the blind spot, of the presence of the robot.

According to at least one non-limiting exemplary embodiment, the processor may be further configured to execute the instructions to map the blind spot on the computer readable map upon detection of an edge of the object, the edge of the object being defined by a corner point and proximate to the blind spot along the route traveled by the robot. The corner point may be detected by detection of an edge beam, edge beam being detected based on a change in distance measurement as a function of angle exceeding a threshold value, the corner point being of the object localized by a beam emitted adjacent to the edge beam.

According to at least one non-limiting exemplary embodiment, the extended measurements are represented by a first region, the first region comprising portions of the computer readable map not in line of sight of any sensor coupled to the robot due to the object, the first region being centered about the robot; the virtual measurements are represented by a second region extending radially from each of at least one virtual robot on the computer readable map; and the blind spot comprises a region of overlap between the first and second regions. By representing the extended measurements using the first region on the computer readable map may represent regions on the computer readable map which the robot, using its sensor units, may not sense or regions which are out of line of sight of the sensor units.

According to at least one non-limiting exemplary embodiment, a non-transitory computer readable memory comprising a plurality of instructions embodied thereon, the instructions, when executed by the specialized processor, configure the specialized processor to detect blind spots by determining intersections between extended measurement beams and virtual measurements from one or more virtual robots upon detecting an object. The one or more virtual robots and virtual measurements comprising simulated robots and simulated measurements, respectively, performed on a computer readable map of an environment based on current localization data of the object; and determine a blind spot based on locations of the intersections. The instructions may further configure the specialized processor to cause the robot to perform a safety action upon reaching a predetermined distance from a blind spot, the safety action comprising emitting an auditory noise, reducing speed of the robot, and/or producing a visual indication to alert nearby humans, whom may possibly be within the blind spot, of the presence of the robot.

According to at least one non-limiting exemplary embodiment, a method for a robot to detect blind spots is disclosed. The method comprises extending measurement beams and virtual measurements from one or more virtual robots upon detecting an object, the one or more virtual robots and virtual measurements comprising simulated robots and measurements, respectively, performed on a computer readable map of an environment based on current localization data of the object; and determining a blind spot based on locations of the intersections. The method further comprises performing a safety action by the robot, the safety action comprising emitting an auditory noise, reducing speed of the robot, and/or producing a visual indication to alert nearby humans, whom may possibly be within the blind spot, of the presence of the robot.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 3A illustrates a robot navigating along a route and localizing an object using a sensor, according to an exemplary embodiment.

Figure 1A:
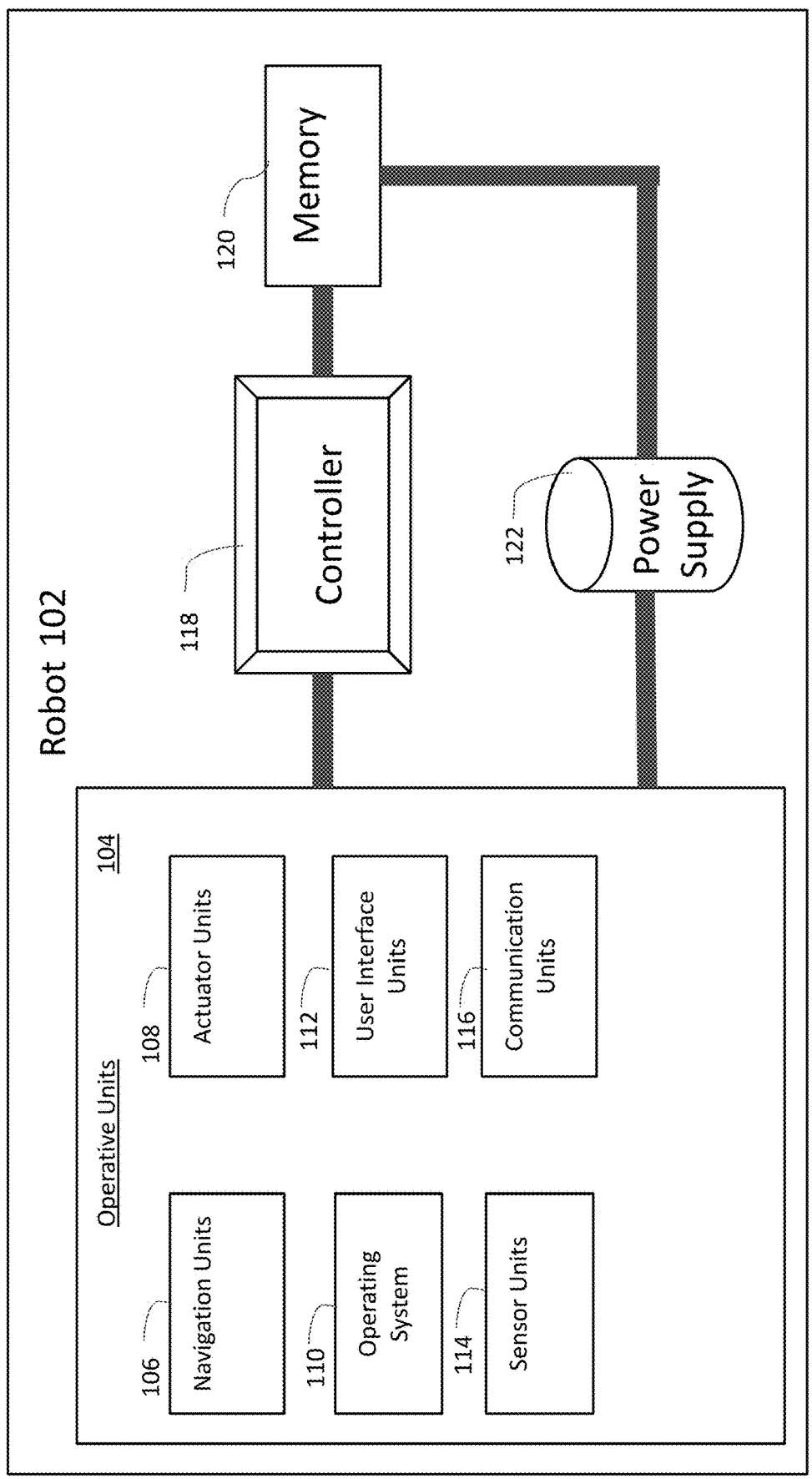
FIG. 1A is a functional block diagram of a main robot in accordance with some exemplary embodiments of this disclosure.

All Figures disclosed herein are © Copyright 2018 Brain Corporation. All rights reserved.

DETAILED DESCRIPTION

Various aspects of the novel systems, apparatuses, and methods disclosed herein are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete and will fully convey the scope of the disclosure to those skilled in the art. Based on the teachings herein, one of ordinary skill in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for improved systems, apparatuses, and methods for bias determination and value calculation of parameters of a robot.

As used herein, a robot may include mechanical and/or virtual entities configured to carry out a complex series of tasks or actions autonomously. In some exemplary embodiments, robots may be machines that are guided and/or instructed by computer programs and/or electronic circuitry. In some exemplary embodiments, robots may include electro-mechanical components that are configured for navigation, where the robot may move from one location to another. Such robots may include autonomous and/or semi-autonomous cars, floor cleaners, rovers, drones, planes, boats, carts, trams, wheelchairs, industrial equipment, stocking machines, mobile platforms, personal transportation devices (e.g., hover boards, SEGWAYS®, etc.), stocking machines, trailer movers, vehicles, and the like. Robots may also include any autonomous and/or semi-autonomous machine for transporting items, people, animals, cargo, freight, objects, luggage, and/or anything desirable from one location to another.

As used herein, a blind spot may comprise a region beyond an obstacle of which a robot cannot observe using its sensors due to line of sight of the sensors being obstructed. For example, blind spots may be observed near corners of passageways or near corners of objects.

As used herein, a virtual robot, virtual projections, virtual objects, virtual correspondences, virtual representations, virtual instances, or virtual indicia may comprise a simulation of a robot on a computer readable map of an environment of the robot, the simulation being performed by a controller or processor of the robot. A virtual robot performing a function virtually may comprise the robot simulating its function at a different location or time. For example, a virtual robot collecting virtual measurements of objects at a location may comprise a robot simulating itself at the location of the virtual robot and collecting simulated measurements based on current localization data of the objects (e.g., based on a computer readable map of an environment). Simulations of measurements may comprise of a controller of a robot measuring a distance from one location to another based on a computer readable map. For example, a computer readable map may comprise pixels, each pixel may represent a space in an environment (e.g., 1 square inch per pixel), wherein a simulated or virtual distance measurement from a virtual robot to an object may be determined based on a number of pixels between the virtual robot and the object on the computer readable map.

As used herein, network interfaces may include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi may include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

As used herein, processor, microprocessor, and/or digital processor may include any type of digital processing device such as, without limitation, digital signal processors ("DSPs"), reduced instruction set computers ("RISC"), complex instruction set computers ("CISC"), microprocessors, gate arrays (e.g., field programmable gate arrays ("FPGAs")), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors may be contained on a single unitary integrated circuit die or distributed across multiple components.

As used herein, computer program and/or software may include any sequence of machine cognizable steps which perform a function. Such computer program and/or software may be rendered in any programming language or environment including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link may include a causal link between any two or more entities (whether physical or logical/virtual), which enables information exchange between the entities.

As used herein, computer and/or computing device may include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

Detailed descriptions of the various embodiments of the system and methods of the disclosure are now provided. While many examples discussed herein may refer to specific exemplary embodiments, it will be appreciated that the described systems and methods contained herein are applicable to any kind of robot or modular attachment for a robot. Myriad other embodiments or uses for the technology described herein would be readily envisaged by those having ordinary skill in the art, given the contents of the present disclosure.

Advantageously, the systems and methods of this disclosure may allow a robot to: (i) determine blind spots as the robot navigates its environment; (ii) enhance safety of operation of the robot; (iii) enable robots to operate in complex environments comprising humans and other objects around the robot. Other advantages may be readily discernable by one having ordinary skill in the art given the contents of the present disclosure.

According to at least one non-limiting exemplary embodiment, a robotic system is disclosed. The robotic system may comprise a non-transitory computer readable memory and a processor configured to execute instructions stored on the memory to detect a blind spot, caused by a nearby object, ahead of a robot along a route by first projecting at least one virtual robot ahead of the robot along a route, the object being detected using a sensor coupled to the robot. At least one virtual robot may collect virtual measurements, wherein the virtual measurements comprise of expected or simulated measurements that the robot would expect to measure at the location of the virtual robot given current localization data of the object on a computer readable map. Next, the processor may continue to execute the instructions to determine a region beyond a surface of the object. In some embodiments, this region may be determined by the controller virtually extending measurements from a sensor of the robot which sense the object. Lastly, the blind spot may be detected based on an overlap between the virtual measurements from at least one virtual robot and the region extending beyond the object. A point along a route of which the robot is navigating closest to the detected blind spot may be determined by the processor executing the instructions, wherein the robot may perform a safety action prior to navigating to the point. The safety action being one of stopping, slowing, or changing direction of the robot and/or emitting a noise or visual indication that the robot is approaching the blind spot.

According to at least one non-limiting exemplary embodiment, a method for detecting a blind spot is disclosed. The method may comprise of a processor of a robot: detecting an object while navigating along a route using at least one sensor; projecting one or more virtual robots ahead of the robot along the route on a computer readable map; determining a first region centered about the robot which encompasses a region on the computer readable map beyond a line of sight (due to the object) of at least one sensor; determining a second region centered about each of the one or more virtual robots; and detecting the blind spot based on an area of overlap between the first and second regions. In some embodiments, the second region may comprise a circular region centered about a respective virtual robot. In some embodiments, the second region may be extended or enlarged from a minimum area until an overlap between the second region and the first region is detected, indicating a blind spot. In some embodiments, the first and second regions may comprise a fixed or predetermined size on the computer readable map.

According to at least one non-limiting exemplary embodiment, a method for detecting a blind stop is disclosed. The method, effectuated by a processor executing computer readable instructions, may comprise of the processor: collecting distance measurements from a sensor comprising a field of view encompassing, at least in part, a region in front of the robot along a route; detecting a corner point based on a change in distance measured as a function of angle along the field of view exceeding a threshold value, indicating a corner of an object is detected; wherein, the corner of the object may comprise or cause a blind spot beyond the corner of the object. This method, further illustrated in FIGS. 6A-B below, may be utilized alone or in conjunction with other methods disclosed herein for detecting blind spots ahead of a robot.

FIG. 1A is a functional block diagram of a robot 102 in accordance with some principles of this disclosure. As illustrated in FIG. 1A, robot 102 may include controller 118, memory 120, user interface unit 112, sensor units 114, navigation units 106, actuator unit 108, and communications unit 116, as well as other components and subcomponents (e.g., some of which may not be illustrated). Although a specific embodiment is illustrated in FIG. 1A, it is appreciated that the architecture may be varied in certain embodiments as would be readily apparent to one of ordinary skill given the contents of the present disclosure. As used herein, robot 102 may be representative at least in part of any robot described in this disclosure.

Controller 118 may control the various operations performed by robot 102. Controller 118 may include and/or comprise one or more processors (e.g., microprocessors) and other peripherals. As previously mentioned and used herein, processor, microprocessor, and/or digital processor may include any type of digital processing device such as, without limitation, digital signal processors ("DSPs"), reduced instruction set computers ("RISC"), complex instruction set computers ("CISC"), microprocessors, gate arrays (e.g., field programmable gate arrays ("FPGAs")), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors may be contained on a single unitary integrated circuit die, or distributed across multiple components.

Controller 118 may be operatively and/or communicatively coupled to memory 120. Memory 120 may include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RL-DRAM"), static RAM ("SRAM"), flash memory (e.g., NAND/NOR), memristor memory, pseudostatic RAM ("PSRAM"), etc. Memory 120 may provide instructions and data to controller 118. For example, memory 120 may be a non-transitory, computer-readable storage apparatus and/or medium having a plurality of instructions stored thereon, the instructions being executable by a processing apparatus (e.g., controller 118) to operate robot 102. In some cases, the instructions may be configured to, when executed by the processing apparatus, cause the processing apparatus to perform the various methods, features, and/or functionality described in this disclosure. Accordingly, controller 118 may perform logical and/or arithmetic operations based on program instructions stored within memory 120. In some cases, the instructions and/or data of memory 120 may be stored in a combination of hardware, some located locally within robot 102, and some located remote from robot 102 (e.g., in a cloud, server, network, etc.).

It should be readily apparent to one of ordinary skill in the art that a processor may be external to robot 102 and be communicatively coupled to controller 118 of robot 102 utilizing communication units 116 wherein the external processor may receive data from robot 102, process the data, and transmit computer-readable instructions back to controller 118. In at least one non-limiting exemplary embodiment, the processor may be on a remote server (not shown).

In some exemplary embodiments, memory 120, shown in FIG. 1A, may store a library of sensor data in a specific way that enhances the functioning of memory 120 and robot 102. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensor units 114 or any other sensor) and/or generated automatically, such as with a computer program that is configured to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 102 operates, the complexity of objects and/or people, the variability in appearance of objects, physical properties of robots, the characteristics of the sensors, and/or the amount of available storage space (e.g., in the library, memory 120, and/or local or remote storage). In exemplary embodiments, at least a portion of the library may be stored on a network (e.g., cloud, server, distributed network, etc.) and/or may not be stored completely within memory 120. As yet another exemplary embodiment, various robots (e.g., that are commonly associated, such as robots by a common manufacturer, user, network, etc.) may be networked so that data captured by individual robots are collectively shared with other robots. In such a fashion, these robots may be configured to learn and/or share sensor data in order to facilitate the ability to readily detect and/or identify errors and/or assist events.

Still referring to FIG. 1A, operative units 104 may be coupled to controller 118, or any other controller, to perform the various operations described in this disclosure. One, more, or none of the modules in operative units 104 may be included in some embodiments. Throughout this disclosure, reference may be to various controllers and/or processors. In some embodiments, a single controller (e.g., controller 118) may serve as the various controllers and/or processors described. In other embodiments different controllers and/or processors may be used, such as controllers and/or processors used particularly for one or more operative units 104. Controller 118 may send and/or receive signals, such as power signals, status signals, data signals, electrical signals, and/or any other desirable signals, including discrete and analog signals to operative units 104. Controller 118 may coordinate and/or manage operative units 104, and/or set timings (e.g., synchronously or asynchronously), turn off/on control power budgets, receive/send network instructions and/or updates, update firmware, send interrogatory signals, receive and/or send statuses, and/or perform any operations for running features of robot 102.

In FIG. 1A, operative units 104 may include various units that perform functions for robot 102. For example, operative units 104 includes at least navigation units 106, actuator units 108, user interface units 112, sensor units 114, and communication units 116. Operative units 104 may also comprise other units that provide the various functionality of robot 102. In exemplary embodiments, operative units 104 may be instantiated in software, hardware, or both software and hardware. For example, in some cases, units of operative units 104 may comprise computer implemented instructions executed by a controller. In exemplary embodiments, units of operative unit 104 may comprise hardcoded logic. In exemplary embodiments, units of operative units 104 may comprise both computer-implemented instructions executed by a controller and hardcoded logic. Where operative units 104 are implemented in part in software, operative units 104 may include units/modules of code configured to provide one or more functionalities.

In exemplary embodiments, navigation units 106 may include systems and methods that may computationally construct and update a map of an environment, localize robot 102 (e.g., find the position) in a map, and navigate robot 102 to/from destinations. The mapping may be performed by imposing data obtained in part by sensor units 114 into a computer-readable map representative at least in part of the environment. In exemplary embodiments, a map of an environment may be uploaded to robot 102 through user interface units 112, uploaded wirelessly or through wired connection, or taught to robot 102 by a user.

In exemplary embodiments, navigation units 106 may include components and/or software configured to provide directional instructions for robot 102 to navigate. Navigation units 106 may process maps, routes, and localization information generated by mapping and localization units, data from sensor units 114, and/or other operative units 104.

Still referring to FIG. 1A, actuator units 108 may include actuators such as electric motors, gas motors, driven magnet systems, solenoid/ratchet systems, piezoelectric systems (e.g., inchworm motors), magnetostrictive elements, gesticulation, and/or any way of driving an actuator known in the art. By way of illustration, such actuators may actuate the wheels for robot 102 to navigate a route; navigate around obstacles; rotate cameras and sensors.

Actuator unit 108 may include any system used for actuating, in some cases to perform tasks. For example, actuator unit 108 may include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art. According to exemplary embodiments, actuator unit 108 may include systems that allow movement of robot 102, such as motorize propulsion. For example, motorized propulsion may move robot 102 in a forward or backward direction, and/or be used at least in part in turning robot 102 (e.g., left, right, and/or any other direction). By way of illustration, actuator unit 108 may control if robot 102 is moving or is stopped and/or allow robot 102 to navigate from one location to another location.

According to exemplary embodiments, sensor units 114 may comprise systems and/or methods that may detect characteristics within and/or around robot 102. Sensor units 114 may comprise a plurality and/or a combination of sensors. Sensor units 114 may include sensors that are internal to robot 102 or external, and/or have components that are partially internal and/or partially external. In some cases, sensor units 114 may include one or more exteroceptive sensors, such as sonars, light detection and ranging ("LIDAR") sensors, radars, lasers, cameras (including video cameras (e.g., red-blue-green ("RBG") cameras, infrared cameras, three-dimensional ("3D") cameras, thermal cameras, etc.), time of flight ("TOF") cameras, structured light cameras, antennas, motion detectors, microphones, and/or any other sensor known in the art. According to exemplary embodiments, sensor units 114 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 114 may generate data based at least in part on measurements. Such data may be stored in specific manner in data structures, such as matrices, arrays, queues, lists, arrays, stacks, bags, etc. According to exemplary embodiments, the measurements may comprise a bias. Such data gathering, collection, and filtering of the same, may be performed in real time that in-turn enhances functioning of robot 102.

According to exemplary embodiments, sensor units 114 may include sensors that may measure internal characteristics of robot 102. For example, sensor units 114 may measure temperature, power levels, statuses, and/or any characteristic of robot 102. In some cases, sensor units 114 may be configured to measure the odometry of robot 102. For example, sensor units 114 may include odometry units, which may comprise sensors such as accelerometers, inertial measurement units ("IMU"), odometers, gyroscopes, speedometers, cameras (e.g. using visual odometry), encoders, clock/timer, and the like. Odometry may facilitate autonomous navigation and/or autonomous actions of robot 102. This odometry may include robot's 102 position (e.g., where position may include robot's location, displacement and/or orientation, and may sometimes be interchangeable with the term pose as used herein) relative to the initial location. Such data may be stored in data structures, such as matrices, arrays, queues, lists, arrays, stacks, bags, etc.

According to exemplary embodiments, user interface units 112 may be configured to enable a user to interact with robot 102. For example, user interface units 112 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users may interact through voice commands or gestures. User interface units 218 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to exemplary embodiments user interface units 112 may be positioned on the body of robot 102. According to exemplary embodiments, user interface units 112 may be positioned away from the body of robot 102 but may be communicatively coupled to robot 102 (e.g., via communication units including transmitters, receivers, and/or transceivers) directly or indirectly (e.g., through a network, server, and/or a cloud). According to exemplary embodiments, user interface units 112 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

According to exemplary embodiments, communications unit 116 may include one or more receivers, transmitters, and/or transceivers. Communications unit 116 may be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

Communications unit 116 may also be configured to send/receive signals utilizing a transmission protocol over wired connections, such as any cable that has a signal line and ground. For example, such cables may include Ethernet cables, coaxial cables, Universal Serial Bus ("USB"), Fire-Wire, and/or any connection known in the art. Such protocols may be used by communications unit 116 to communicate to external systems, such as computers, smart phones, tablets, data capture systems, mobile telecommunications networks, clouds, servers, or the like. Communications unit 116 may be configured to send and receive signals comprising of numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 116 may be configured to send and receive statuses, commands, and other data/information. For example, communications unit 116 may communicate with a user operator to allow the user to control robot 102. Communications unit 116 may communicate with a server/network (e.g., a network) in order to allow robot 102 to send data, statuses, commands, and other communications to the server. The server may also be communicatively coupled to computer(s) and/or device(s) that may be used to monitor and/or control robot 102 remotely. Communications unit 116 may also receive updates (e.g., firmware or data updates), data, statuses, commands, and other communications from a server for robot 102.

In exemplary embodiments, operating system 110 may be configured to manage memory 120, controller 118, power supply 122, modules in operative units 104, and/or any software, hardware, and/or features of robot 102. For example, and without limitation, operating system 110 may include device drivers to manage hardware recourses for robot 102.

In exemplary embodiments, power supply 122 may include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or plugging into an external power source. Power supply 122 may also be any supplier of energy, including wall sockets and electronic devices that convert solar, wind, water, nuclear, hydrogen, gasoline, natural gas, fossil fuels, mechanical energy, steam, and/or any power source into electricity.

One or more of the units described with respect to FIG. 1A (including memory 120, controller 118, sensor units 114, user interface unit 112, actuator unit 108, communications unit 116, mapping and localization unit 126, and/or other units) may be integrated onto robot 102, such as in an integrated system. However, according to exemplary embodiments, one or more of these units may be part of an attachable module. This module may be attached to an existing apparatus to automate so that it behaves as a robot. Accordingly, the features described in this disclosure with reference to robot 102 may be instantiated in a module that may be attached to an existing apparatus and/or integrated onto robot 102 in an integrated system. Moreover, in some cases, a person having ordinary skill in the art would appreciate from the contents of this disclosure that at least a portion of the features described in this disclosure may also be run remotely, such as in a cloud, network, and/or server.

As used here on out, a robot 102, a controller 118, or any other controller, processor, or robot performing a task illustrated in the figures below comprises a controller 118 or processor 130, illustrated in FIG. 1B next, executing computer readable instructions stored on a non-transitory computer readable storage apparatus, such as memory 120, as would be appreciated by one of ordinary skill in the art.

Figure 1B:
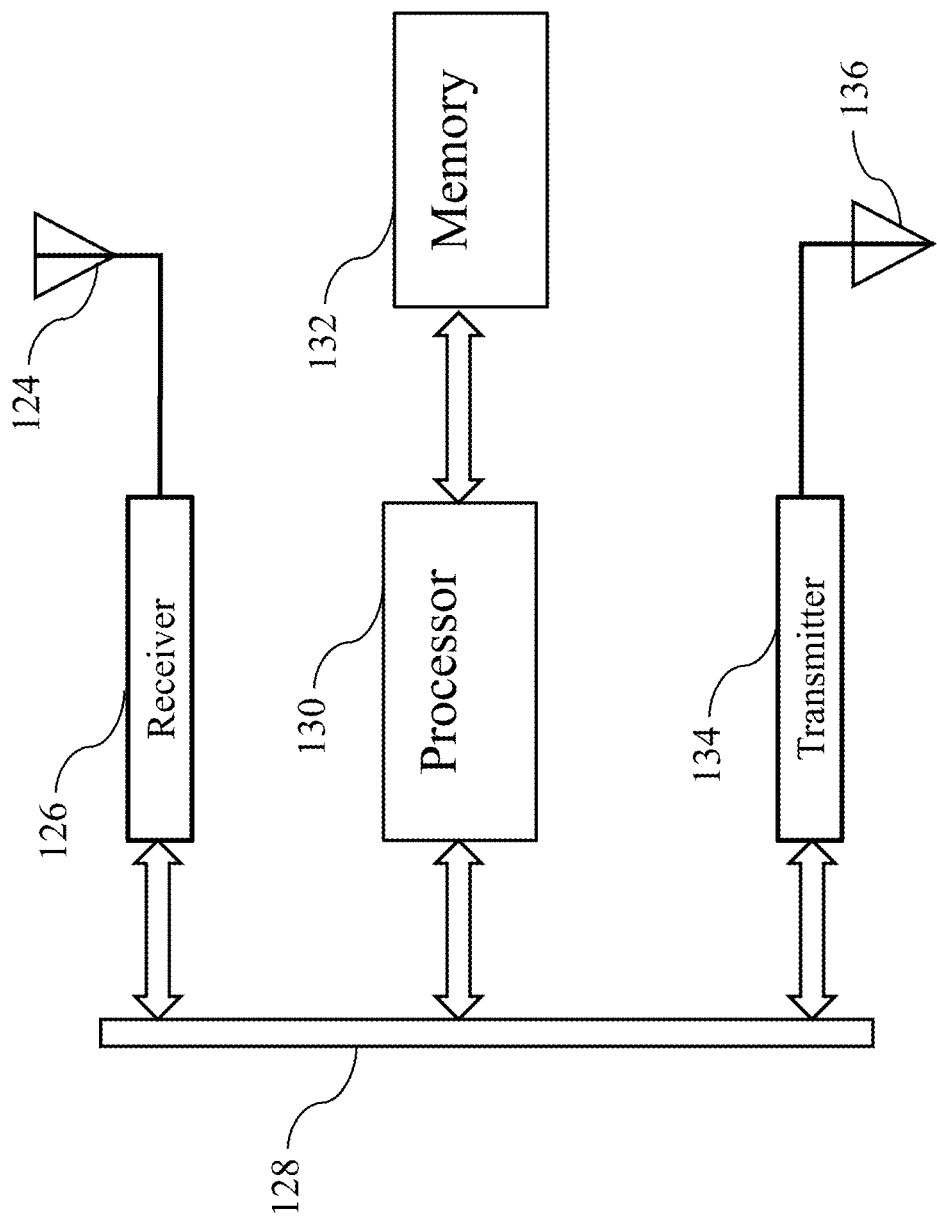
FIG. 1B is a functional block diagram of a controller or processor in accordance with some exemplary embodiments of this disclosure.

Next referring to FIG. 1B, the architecture of the specialized controller 118 used in the system shown in FIG. 1A is illustrated according to an exemplary embodiment. As illustrated in FIG. 1B, the specialized controller 118 may include a data bus 128, a receiver 126, a transmitter 134, at least one processor 130, and a memory 132. The receiver 126, the processor 130 and the transmitter 134 all communicate with each other via the data bus 128. The processor 130 may be a specialized processor configured to execute specialized algorithms. The processor 130 is configured to access the memory 132 which stores computer code or instructions in order for the processor 130 to execute the specialized algorithms. As illustrated in FIG. 1B, memory 132 may comprise some, none, different, or all of the features of memory 124 previously illustrated in FIG. 1A. The algorithms executed by the processor 130 are discussed in further detail below. The receiver 126 as shown in FIG. 1B is configured to receive input signals 124. The input signals 124 may comprise signals from a plurality of operative units 104 illustrated in FIG. 1A including, but not limited to, sensor data from sensor units 114, user inputs, motor feedback, external communication signals (e.g., from a remote server), and/or any other signal from an operative unit 104 requiring further processing by the specialized controller 118. The receiver 126 communicates these received signals to the processor 130 via the data bus 128. As one of ordinary skill in the art would appreciate, the data bus 128 is the means of communication between the different components—receiver, processor, and transmitter—in the specialized controller 118. The processor 130 executes the algorithms, as discussed below, by accessing specialized computer-readable instructions from the memory 132. Further detailed description as to the processor 130 executing the specialized algorithms in receiving, processing and transmitting of these signals is discussed above with respect to FIG. 1A.

The memory 132 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, nonvolatile, dynamic, static, read/write, read-only, random-access, sequential-access, location-addressable, file-addressable, and/or content-addressable devices. The processor 130 may communicate output signals to transmitter 134 via data bus 128 as illustrated. The transmitter 134 may be configured to further communicate the output signals to a plurality of operative units 104 illustrated by signal output 136. Communication of such output signals results in unconventional results as disclosed herein.

One skilled in the art would appreciate that the architecture illustrated in FIG. 1B may illustrate an external server architecture configured to effectuate the control of a robotic apparatus from a remote location. That is, the server may also include a data bus, a receiver, a transmitter, a processor, and a memory that stores specialized computer readable instructions thereon.

Figure 2:
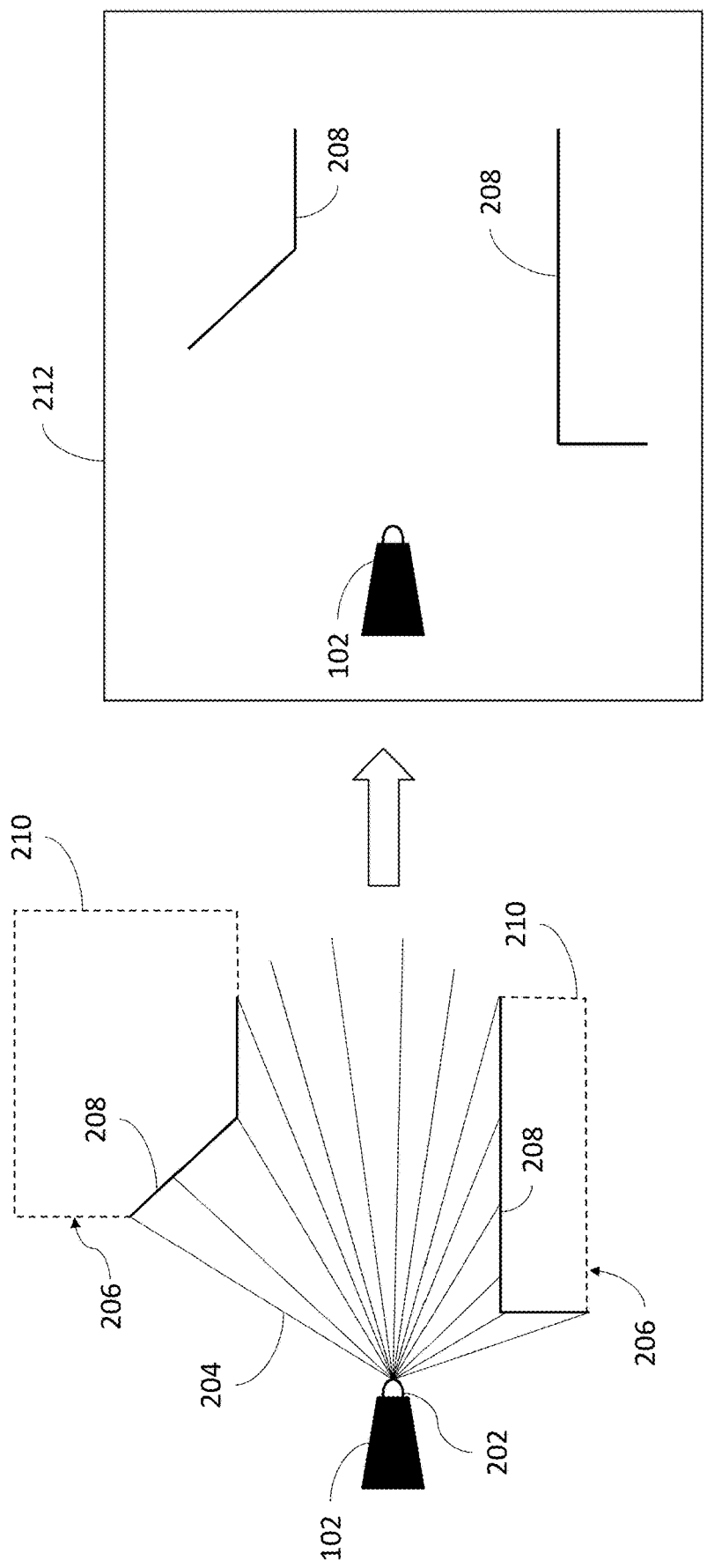
FIG. 2 illustrates a robot utilizing a sensor to detect objects and localize the objects on a computer readable map in accordance with some exemplary embodiments of this disclosure.

FIG. 2 illustrates a robot 102 collecting localization data of nearby objects 206 using a sensor 202 to collect distance measurements of surfaces 208 of the objects 206 by emitting beams 204, to illustrate how a controller 118 of the robot 102 may generate a computer readable map 212 of its environment based on the localization data, in accordance with some exemplary embodiments of the present disclosure. Sensor 202 may be illustrative of a light detection and ranging ("LiDAR") sensor of sensor units 114, such as a planar LiDAR or depth camera sensor, configured to collect distance measurements using beams 204 emitted from the sensor 202 at discrete angles, wherein some of the beams 204 have been omitted for clarity. As illustrated, some beams 204 reach surfaces 208 (illustrated by solid lines) of the objects 206 thereby enabling the controller 118 to localize the surfaces 208 based on a distance measurement (e.g., time of flight ("TOF") of a beam 204), and an angle from which a beam 204 is emitted from the sensor 202. By localizing the surfaces 208 (i.e., collecting x-y position of locations where beams 204 reach surfaces 208), the controller 118 may map the surfaces 208 on a computer readable map 212 as illustrated based on a comparison of the localization data and a reference coordinate system of the computer readable map 212 (i.e., x-y axis of the computer readable map 212). Additionally, some beams 204 do not reach surfaces 208 of the object due to, for example, the beams 204 exceeding a maximum detection range of the sensor 202 without reaching a surface of an object 206, wherein the controller 118 may determine no objects are detected by those beams 204 and may therefore not map any surfaces 208 on the computer readable map 212.

Objects 206 may comprise additional surfaces 210 (illustrated by dashed lines) not visible to the sensor 202 due to the surfaces 210 being out of a line of sight from the sensor 202 or out of detection range by the sensor 202 (illustrated by some beams 204 which do not reach surfaces 208 having a finite length). Accordingly, these surfaces 210 are not mapped onto the computer readable map 212. It is appreciated by one skilled in the art that the robot 102 may localize the surfaces 210 by moving around its environment and collecting additional localization data of the objects 206 using its sensor 202 at different locations. Additionally, it is appreciated by one skilled in the art that the computer readable map 212 may be stored in a non-transitory computer readable memory unit internal to the robot 102 (e.g., memory 120) or external to the robot 102 (e.g., on an external server communicatively coupled to the robot 102). A computer readable map 212 may be updated in real time by a controller 118 of a robot 102 based on new localization data of surfaces 208 collected at later a time by the sensor 202 as the robot 102 navigates through its environment (i.e., a computer readable map 212 may be updated based on detected changes in position of objects 206 within an environment). Data from the computer readable map 212, comprising localization data of surfaces 208 of objects 206, may be accessed by a controller 118 and may be utilized to perform some of the functions disclosed herein.

According to at least one non-limiting exemplary embodiment, a robot 102 may utilize a plurality of sensors (e.g., sensor units 114) to collect localization data of surfaces 208, wherein a generated computer readable map 212 may further include localization data of the surfaces 208 generated by measurements from the plurality of sensors superimposed onto one or more computer readable maps 212. According to at least one non-limiting exemplary embodiment, a robot 102 may utilize a plurality of different types of sensor to localize surfaces 208 of objects 206 such as, for example, depth cameras and specialized distance measuring algorithms which utilize images captured by the depth cameras to determine distances between the depth camera and a surface 208 of an object 206. That is, the use of a LiDAR sensor 202 to collect localization data of surfaces 208 of objects 206 is not intended to be limiting. Accordingly, as used herein, any computer readable map comprising objects localized therein using a sensor unit 114 may similarly be generated using data from two or more sensor units 114.

According to at least one non-limiting exemplary embodiment, a computer readable map 212 may comprise a three-dimensional ("3D") map of objects 206 if a sensor 202, or other sensor unit 114, is configured to collect distance measurements (e.g., generate beams 204) in three dimensions.

According to at least one non-limiting exemplary embodiment, a computer readable map 212 may be generated using sensors external to a robot 102 such as, for example, closed circuit television cameras located throughout an environment capturing images of objects 206. According to at least one non-limiting exemplary embodiment, a robot 102 may be provided a computer readable map 212 by an operator or an external server communicatively coupled to the robot 102 via wired or wireless communication.

As used here on out, a robot 102 performing a function based on current localization data available to the robot 102 may include the robot 102 performing the function based on a computer readable map, such as map 212, wherein the computer readable map may comprise localization of none, some, or all objects and their corresponding surfaces within an environment of the robot 102.

Figure 3B:
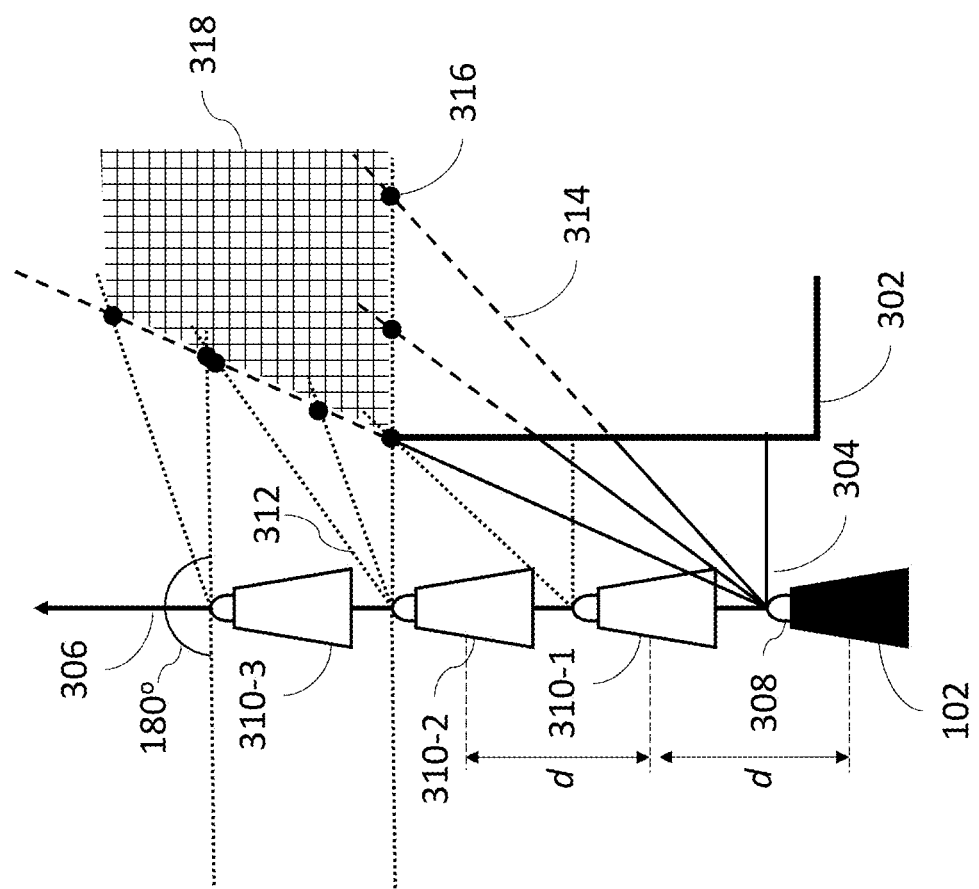
FIG. 3B illustrates the robot of FIG. 2A projecting a plurality of virtual robots to determine a blind spot, according to an exemplary embodiment.

FIG. 3A illustrates a robot 102 detecting an object 302 using a sensor 308 along a route 306, according to an exemplary embodiment. The sensor 308 may comprise a LiDAR sensor configured to collect distance measurements between the sensor 308 and a surface of the object 302 based on a TOF of beams 304 emitted from the sensor 308 at discrete angles. Sensor 308 may, in some embodiments, be illustrative of two or more exteroceptive sensor units 114 (e.g., depth cameras, RGB cameras, etc.), wherein data from these sensor units 114 are utilized by a controller 118 to generate a computer readable map. Object 302 may comprise an object not yet localized on a computer readable map of an environment, as illustrated by only a portion of the surface of the object 302 being shown. A computer readable map of an environment may comprise data stored in memory 120 of a robot 102, or similar memory unit (e.g., memory unit of a cloud server communicatively coupled to the robot 102), the data corresponding to localization data of objects, such as object 302, within the environment. Accordingly, only a portion of the surface of the object 302 has been detected and localized by the robot 102 as illustrated. The robot 102 may be configured to, upon detecting an object 302, project a plurality of virtual robots 310 to determine possible blind spots 318, as illustrated next in FIG. 3B. One of ordinary skill in the art may appreciate that virtual robots may correspond to one or more virtual projections, one or more virtual objects, one or more virtual correspondences, one or more virtual representations, one or more virtual instances, or one or more virtual indicia.

According to non-limiting exemplary embodiments, sensor 308 may comprise some, none, all, or different features of sensor units 114 illustrated above in FIG. 1A including, for example, depth cameras, RGB cameras, and the like.

One skilled in the art would appreciate a plurality of beams 304 may be emitted from a sensor 308 of a robot 102, wherein a majority of the beams 304 have been omitted for clarity.

FIG. 3B illustrates the robot 102, illustrated above in FIG. 3A, navigating further along the route 306 and projecting a plurality of virtual robots 310 along the route 306 to detect a blind spot 318, according to an exemplary embodiment. The virtual robots 310 may comprise simulated future positions of the robot 102 as the robot 102 navigates along the route 306, wherein the virtual robots 310 may collect virtual scans 312, illustrated by dotted lines, comprising simulated measurements 304 of what the robot 102 expects or anticipates to observe with the sensor 308 at the locations of the virtual robots 310 based on current localization data of the object 302 (and other localized objects not shown) across, for example, a 180° measurement range as illustrated. It is appreciated that the robot 102 may simulate a plurality of virtual measurements 312 from the virtual robots 310, wherein many of the virtual measurements 312 have been omitted for clarity. The virtual robots 310 may be positioned at integer multiples of a distance d ahead of the robot 102 along the route 306, d being any predetermined distance set by an operator/manufacturer or determined by a controller 118 of the robot 102.

To determine a location of a blind spot 318, the robot 102 may generate extended beams 314, illustrated with dashed lines, beyond the surface of the object 302 by virtually extending measurements 304 on a computer readable map of its environment. The blind spot 318 may be defined based on locations where the extended beams 314 intersect with virtual scans 312 which do not detect the object 302, as shown by intersections 316 (black circles). Similarly, virtual robot may also no longer detect the object 302 at its location using virtual measurements 312, wherein virtual measurements 312 from the robot may be additionally utilized to determine additional intersections 316 to define the blind spot 318. Some virtual measurements 312 may be utilized from a virtual robot to define the blind spot 318, wherein the virtual measurements 312 utilized comprise measurements which do not detect the surface of the object 302 based on current localization data. Additionally, a plurality of intersection points 316 may lie within the blind spot 318, which have been omitted for clarity. A size of the blind spot 318 to be mapped on a computer readable map of an environment may comprise intersections between a predetermined number of extended beams 314 and a predetermined number of beams 312 to ensure the area encompassed by the blind spot 318 is finite. For example, the area encompassed by a blind spot 318 may comprise intersections 316 between twenty (20) extended beams 314 across a first measurement range (e.g., 60°-40° with respect to the axis of the route 502 being at 0°) and twenty (20) virtual measurements 312 across a second measurement range (e.g., 180°-160° with respect to the axis of the route 502 being at 0°). According to at least one non-limiting exemplary embodiment, a size of the blind spot 318 may be limited by a threshold value of maximum space occupied by the blind spot 318 on a computer readable map or may be defined based on a threshold number of intersections 316 within the blind spot 318 (e.g., 100 intersections).

It is appreciated by one skilled in the art that virtual measurements 312 may be determined based on a controller 118 determining distances between a virtual robot 310 and nearby object 302 on a computer readable map, wherein virtual measurements 312 may represent measured distances based on a computer readable map and not limited to simulated measurements (e.g., simulating a TOF of beams 304 from sensor 308). Similarly, extended beams 314 may be illustrative of lines or rays drawn or imposed on a computer readable map to determine a blind spot 318, wherein beams 304 and extended beams 314 are not intended to be limited to measurements from a TOF sensor 308 in the illustrated configuration. For example, the robot 102 may comprise an origin, or point where an (x, y, z) position of the robot 102 is defined with respect to, wherein beams 304 and extended portions 314 thereof may be drawn from the robot origin and extend across a 360° range. Similarly, each virtual robot 102 may comprise an origin, wherein virtual measurements 312 may be line segments or rays extending from the virtual robot origin across a 360° range. That is, as used herein, any virtual measurement 312, beam 304, or extended measurement 314 may be performed by a controller 118 using rays or line segments imposed on a computer readable map and are not intended to be limited to use of TOF LiDAR sensors, or simulated measurements therefrom, configured in the illustrated example. This is further illustrated below in FIG. 7.

According to at least one non-limiting exemplary embodiment, a controller 118 may generate a plurality of rays from predetermined locations along a route 306 to determine a location of a blind spot 318, wherein the virtual robots 310 illustrated may be implemented as points along the route 306, separated by predetermined distances d, and virtual measurements 312 and extended measurements 314 may be implemented by the controller 118 generating the plurality of rays. Similarly, if a robot 102 does not comprise a sensor 308, the controller 118 may generate a plurality of rays or line segments extending from a point on the robot 102 beyond an object 302 on the computer readable map, similar to measurements 304 and extended measurements 314. The rays may comprise line segments from the predetermined locations along the route and a point on the robot 102 at discretized angles (e.g., similar to a simulated LiDAR measurement) and may be used instead of measurements 304, 312, and 314 to determine a location of a blind spot 318 on a computer readable map based on intersections between the rays beyond an object 302 using substantially similar geometric relationships. In other words, extending measurements 304 to generate extended measurements 314 and the use of virtual robots generating virtual measurements 312 to determine intersections 316 to define a blind spot 318 is not intended to be limiting to robots 102 comprising a sensor 308 as illustrated or robots 102 capable of generating virtual robots 310, wherein one skilled in the art would recognize that a plurality of substantially similar methods may be performed to determine a blind spot 318 using rays, similar to the geometric relationship of measurements 304, 312, and 314 as illustrated, on a computer readable map.

According to at least one non-limiting exemplary embodiment, a robot 102 may generate a single virtual robot 310 to determine a blind spot 318. The single virtual robot 310 may be projected at a location of the robot 102 and moved along the route 306 ahead of the robot 102 (e.g., faster than the robot 102) until the single virtual robot 310 does not detect object 302 (e.g., moves to the position of virtual robot as illustrated) across an entire at least 180° measurement range. The blind spot 318 may then be determined based on intersections 316 between virtual measurements 312 from the single virtual robot 310 and extended measurements 314 from the robot 102.

Figure 3C:
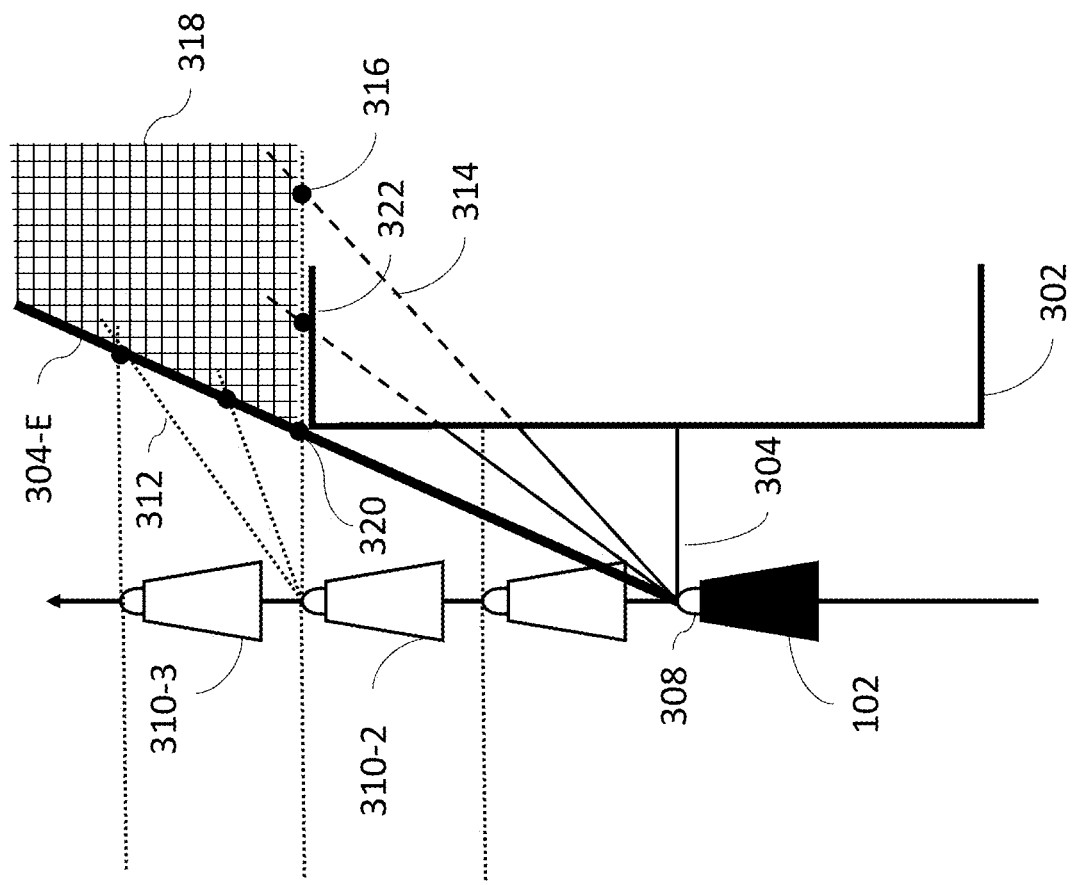
FIG. 3C illustrates the robot of FIGS. 2A-B navigating further along a route and updating a location of a blind spot based on new localization data, according to an exemplary embodiment.

Next, referring to FIG. 3C, the robot 102, illustrated in FIGS. 3A-B above, continues to navigate along the route 306, according to an exemplary embodiment, as evidenced by robot 102 traveling along the route 306. As the robot 102 navigates along the route 306, more localization data of the object 302 may be collected from sensor 308. Accordingly, as more localization data of the object 302 is collected, a location of the blind spot 318 is updated as locations of intersections 316 may change as additional localization data of the object 302 is collected. As the robot 102 navigates the route 306, the plurality of virtual robots 310 may maintain the predetermined distance d from the robot 102 and other virtual robots 310. Determination of the blind spot 318 may still be defined based on intersections 316 between extended beams 314 and virtual scans 312 from a virtual robot, which do not detect the object 302 across at least a 180° measurement range based on current localization data, as illustrated above in FIG. 3B.

As illustrated, an edge beam 304-E (bolded) at an upper edge 322 of the object 302 may extend beyond the object 302, thereby enabling the robot 102 to localize the upper edge 322 of the object 302. The edge beam 304-E may comprise a beam 304 emitted at a discrete angle from the sensor 308 which does not detect the surface of the object 302, wherein an adjacent beam 304 does detect the surface of the object 302. Edge beam 304-E may be determined by detecting a substantial increase (e.g., exceeding a threshold) in a change of distance measurements as a function of angle at an angle of the edge beam 304-E. A controller 118 of the robot 102 may, upon the robot 102 detecting the edge beam 304-E extending beyond the surface of the object 302 (i.e., upon the robot 102 localizing the upper edge 322 of the object 302), map a current location of the blind spot 318 on a computer readable map. Accordingly, a corner point 320 may be defined based on a localized corner of the object 302 closest, or proximate, to the route 306, the localized corner may comprise a substantially similar location as a closest, or proximate, corner of the blind spot 318 as illustrated and may be defined by a corner point 320. Corner point 320 may define a corner of the object 302 and a corner of the blind spot 318 as the two corners may be localized at substantially similar locations. The corner point 320 being detected by a beam 304 directly adjacent to the edge beam 304-E which detects the object 302, as further illustrated in FIGS. 6A-B below.

According to at least one non-limiting exemplary embodiment, a robot 102 may detect an upper edge 322 of an object using a plurality of different methods and/or sensor units 114 (e.g., imaging cameras). One skilled in the art would appreciate that the robot 102 may not directly observe the upper edge 322 and may simply detect an end of a surface of the object 302 of which measurements 304 detect, based on a sudden increase in magnitude of a measurements 304 (e.g., 304-E), and define the end as the upper edge 322 by assigning a corner point 320.

Figure 3D:
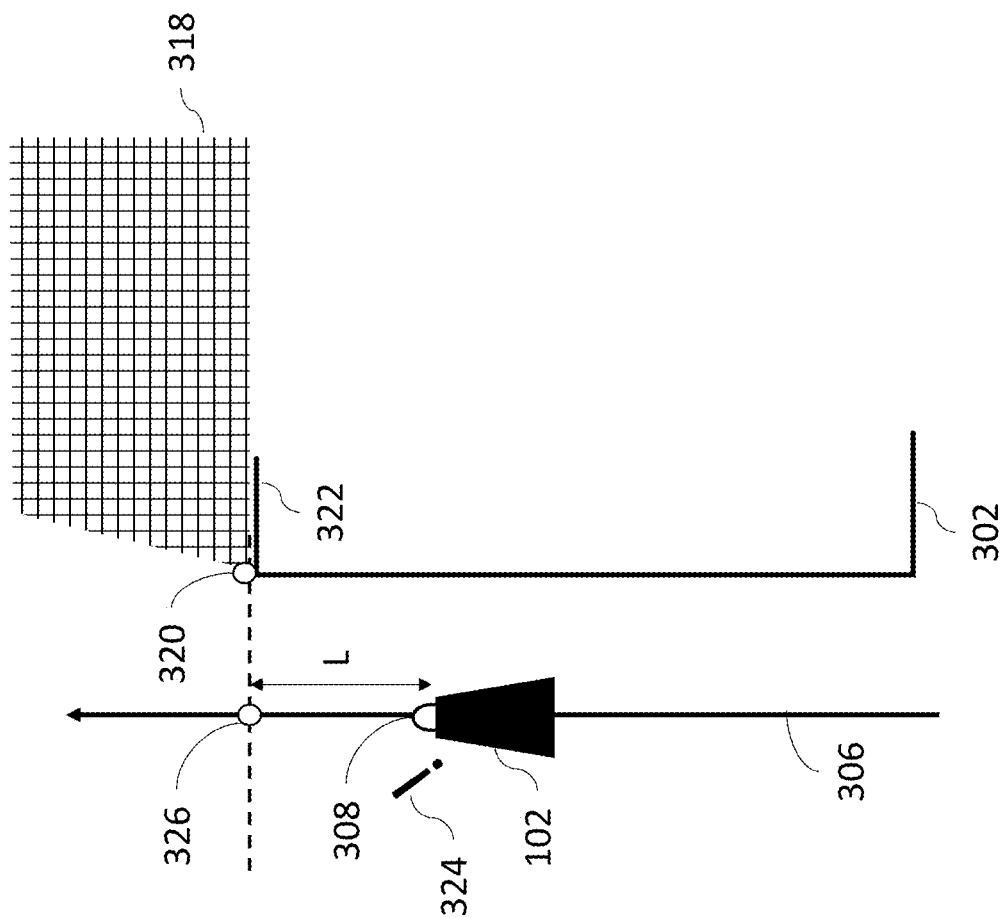
FIG. 3D illustrates the robot of FIGS. 2A-C performing an action at a predetermined distance from a blind spot to ensure safety, according to an exemplary embodiment.

Next, FIG. 3D illustrates the robot 102, illustrated in FIGS. 3A-C above, navigating along the route 306 and performing a safety action 324 upon reaching a predetermined distance L from a point 326 along the route 306, according to an exemplary embodiment. The robot 102, upon reaching the distance L from the point 326, may perform the safety action 324, illustrated by an exclamation mark, to ensure safe navigation near the blind spot 318. The safety action 324 may comprise the robot 102 slowing down, emitting a noise, displaying a visual indication (e.g., lights), changing its trajectory, and/or any other similar safety measure to, for example, alert humans walking within the blind spot 318 that the robot 102 is approaching from behind the object 302 (from the perspective of the humans). The location of the point 326 may be based on a Euclidian distance calculation to determine a closest, or proximate, point along the route 306 from the blind spot 318 or corner point 320.

Advantageously, the present disclosure may enhance the safety of operating a robot 102 within environments comprising objects 302 which may generate blind spots 318 such as, for example, a robot 102 operating within aisles in a store. The use of projected beams 314 and virtual robots 310 produce an unconventional result in that the robot 102 may determine blind spots 318 in real time without any prior localization data of an object 302. One skilled in the art would appreciate that the shape of the object 302 illustrated in FIGS. 3A-D above may comprise any shape, wherein the rectangular shape illustrated provides a maximum area encompassed by the blind spot 318 and is not intended to be limiting. Additionally, one skilled in the art would appreciate that a corner point 320 may be defined at a substantially similar location if measurements 312 from virtual robots 310 are taken across a measurement range below 180°. However, if virtual robots 312 do not measure across an at least 180° measurement range the region encompassed by a blind spot 318 on a computer readable map may not accurately reflect all regions of which a robot 102 may be unable to detect using a sensor 308, or other sensor units 114. In some embodiments, determination of a size of the blind spot 318 may not be necessary for safe operation of the robot 102, wherein only a location of point 326, where the robot 102 may perform a safety action 324 prior to reaching the point 326, may be necessary to safely operate the robot 102 near a blind spot 318.

Figure 4:
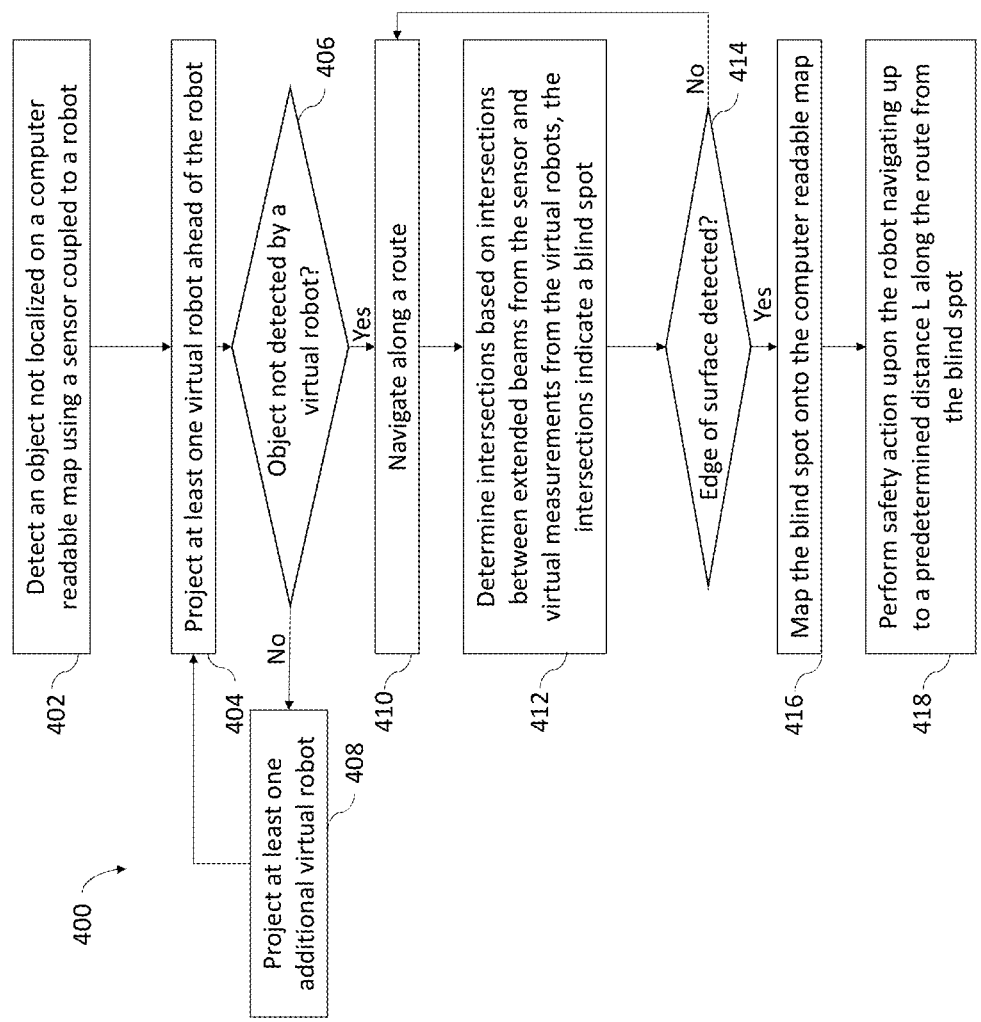
FIG. 4 is a process flow diagram of a method for a robot to detect and map blind spots and perform an action to ensure safety, according to an exemplary embodiment.

FIG. 4 illustrates a method 400 for a controller 118 of a robot 102 to determine a blind spot 318 and perform a safety action 324, according to an exemplary embodiment. The robot 102 may comprise no localization data of objects 302 within its environment, wherein the robot 102 may execute method 400 to determine and map locations of blind spots 318 as the robot 102 collects localization data of the objects within its environment (e.g., in an exploration operational mode). It is appreciated that any steps of method 400 performed by the controller 118 are effectuated by the controller 118 executing computer readable instructions from memory 120.

According to at least one non-limiting exemplary embodiment, a robot 102 may comprise a computer readable map of its environment stored in memory 120 comprising localization data of objects 302 within its environment, wherein the robot 102 may perform some or all of the steps of method 400 virtually (e.g., simulated on the computer readable map) or in real time as the robot 102 navigates a route.

One skilled in the art would appreciate any functions performed by a virtual robot 310 may comprise a controller 118 of a robot 102 simulating the functions based on data available to the robot 102 stored in a memory 120. For example, a virtual robot 310 performing a virtual measurement 312 may comprise a controller 118 simulating an expected measurement based on current localization data of objects on a computer readable map stored in a memory 120.

As illustrated in FIG. 4, block 402 illustrates the controller 118 detecting an object 302 near the robot 102 using a sensor 308 of sensor units 114, as illustrated above in FIG. 3A. The robot 102 may localize the object 302 on a computer readable map of its environment based on data from sensor units 114. In some embodiments, the robot 102 may utilize two or more sensor units 114 to detect the object and produce a computer readable map.

Block 404 illustrates the controller 118 projecting, on the computer readable map of the environment, at least one virtual robot 310 at integer multiples of a predetermined distance d from the robot 102 along a route. At least one virtual robot 310 may collect virtual scans 312 of the object 302 based on current localization data collected by the robot 102 and stored in memory 120, the virtual scans 312 comprising simulated measurements from the sensor 308 based on the current localization data.

Block 406 illustrates the controller 118 determining if one or more of the virtual robots 310 do not detect the surface of the object 302 using virtual scans 312. The virtual scans 312 comprise simulated measurements by the controller 118. If the one or more virtual robots 310 do not detect the surface of the object 302, the controller 118 may assume the one or more virtual robots 310 are collecting simulated measurements 312 beyond the object 302, as illustrated in FIG. 3B with respect to virtual robots and thereby enabling the controller 118 to assume a location of an upper edge 322 of the object 302, which may cause a blind spot 318 based on current localization data of the object 302 on a computer readable map.

Upon the controller 118 determining one or more virtual robots 310 does not detect the surface of the object 302, the controller 118 moves to block 410.

Upon the controller 118 determining that no virtual robots 310 do not detect the surface of the object 302, the controller 118 may move to block 408 to generate additional virtual robots at the predetermined distances d ahead of the forward most virtual robot 310.

According to at least one non-limiting exemplary embodiment, a controller 118 may, in step 404, generate a single virtual robot 310 at a location of the robot 102 along a route instead of generating a plurality of virtual robots 310. The controller 118 may move the single virtual robot 310 along the route until the single virtual robot 310 no longer detects a surface of an object 302 across an at least 180° measurement range, or measurement range (i.e., field of view) of the sensor 308, based on current localization data of the surface of the object 302.

According to at least one non-limiting exemplary embodiment, the determination in block 406 may comprise of the controller 118 determining if at least one virtual measurement 312 from at least one respective virtual robot 310 does not detect the object 302. This determination may, in some instances, cause a shape of a determined blind spot 318 to not accurately represent a region beyond the object 302 out of line of sight of the sensor of the robot; however, the corner point 320, and thereby point 326, may still be detected at a same location.

Block 410 illustrates the controller 118 navigating or moving the robot 102 along the route (e.g., using actuator units 108). As the robot 102 navigates along the route, the virtual robots 310 also navigate along the route at the same rate as the robot 102 as the virtual robots 310 may maintain the predetermined distance d from the robot 102 and other virtual robots 310, as illustrated in FIG. 3B. The controller 118 may perform the functions illustrated in blocks 14 discussed below in real time as the robot 102 navigates along the route such that the blind spot 318 may be continuously updated based on new localization data received by the robot 102 as it navigates along the route.

Figure 7:
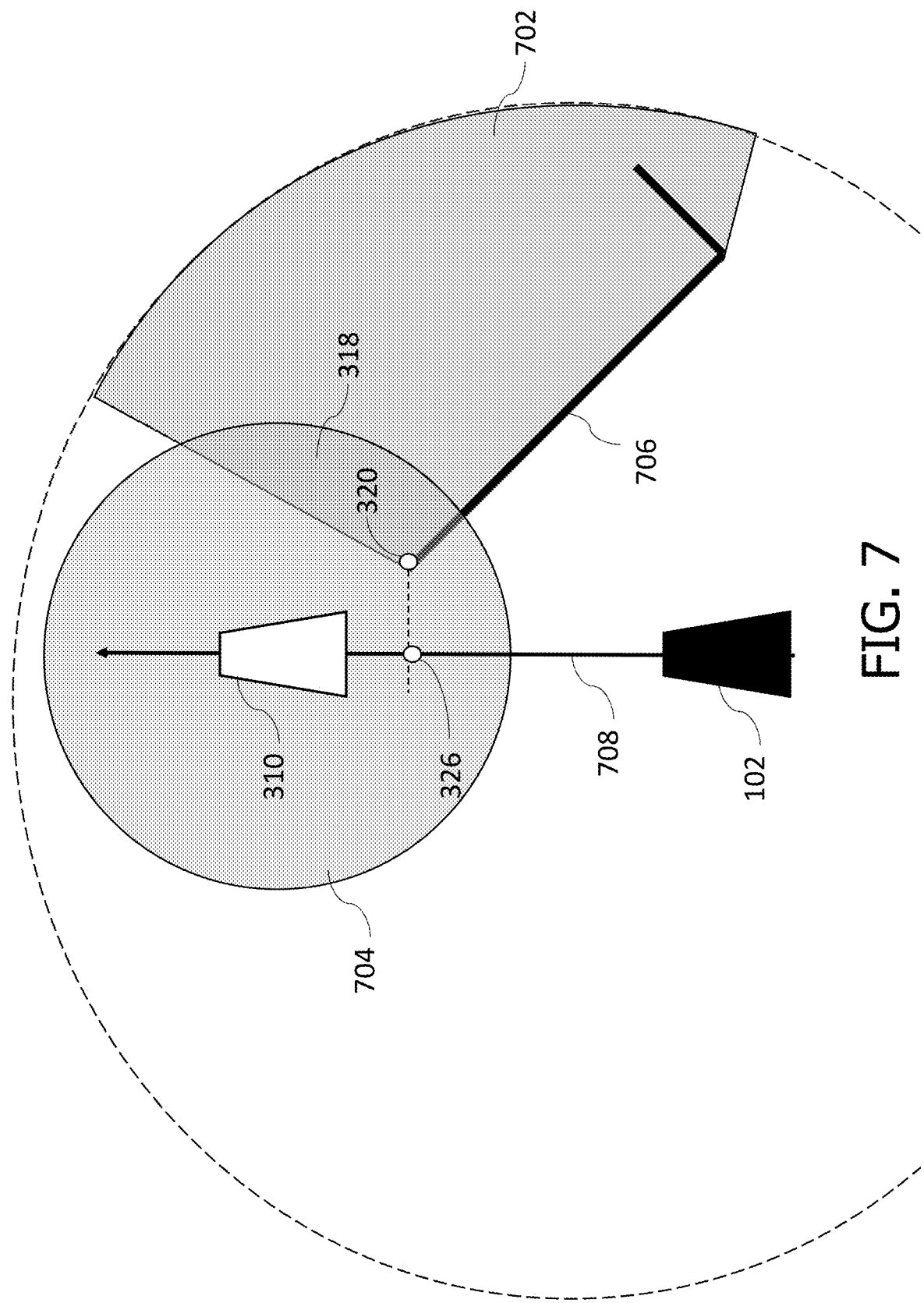
FIG. 7 illustrates broadly the systems and methods of this disclosure for detection of blind spots, according to an exemplary embodiment.

Block 412 illustrates the controller 118 determining intersections 316 based on points of intersection between extended beams 314 from the sensor 308 and virtual measurements 312 from at least one virtual robots 310. The intersections 316 indicate a blind spot 318. Extended beams 314 may comprise extensions of measurement beams 304 emitted from the sensor 308. In some embodiments, extended beams 314 may be illustrative of geometric rays or line segments imposed on the computer readable map extending from the robot 102 at discrete angles about the robot 102 which extend beyond a surface of the detected surface of object 302. That is, extended beams 314 may be embodied using geometric shapes (e.g., as illustrated in FIG. 7 below) imposed onto a computer readable map and are not intended to be limited to extensions of physical properties or functions of the robot 102 (e.g., extensions of measurements 304 from a sensor 308). Virtual measurements 312 may comprise simulated measurements from a respective virtual robot 310, the simulated measurements correspond to measurements the robot 102 expects to make based on current localization data of the object 302 using sensor 308 and/or other sensor units 114 at a future position of the respective virtual robot 310. Intersections 316 may be determined based on locations where extended beams 314 intersect with virtual measurements 312, as illustrated above in FIGS. 3B-C.

These intersections 316 may denote a blind spot 318 on the computer readable map, wherein the controller 118 may localize the blind spot 318 on the computer readable map. It is appreciated that until an edge 322 of the object 302 is detected, the blind spot 318 may move with motions of the robot 102 as additional surfaces, or portions thereof, of the object 302 are sensed and localized (e.g., as illustrated in FIG. 3 above). In some embodiments, detection of an edge 322 of the object 302, as illustrated next in block 414, may cause the controller 118 to fix the position of the blind spot 318 on the computer readable map for, for example, later navigation nearby the object 302. Mapping of the blind spot 318 onto the computer readable may enhance computing capabilities of the controller 118 as the controller 118 may only be required to map the blind spot 318 once, unless substantial changes to the environment and/or object 302 are detected which change the location of the blind spot 318.

Figure 6B:
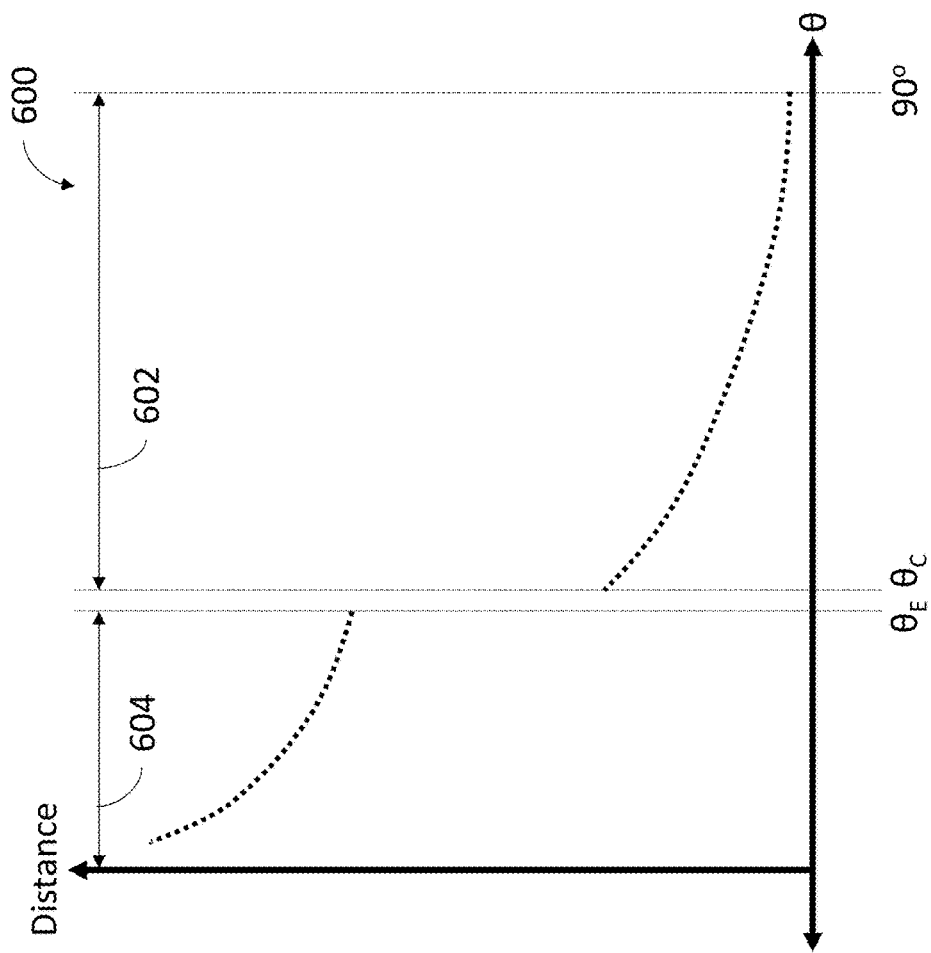
FIGS. 6A-B illustrate a method for detection of a corner point and edge beam, according to an exemplary embodiment.

Block 414 illustrates the controller 118 determining if an edge 322 of the surface of the object 302 is detected. The controller may make the determination based on an edge beam 304-E being detected. The edge beam 304-E may comprise a measurement beam 304 from the sensor 308 of the robot 102 extending beyond the surface of the object 302, as illustrated in FIG. 3C, signifying the upper edge 322 of the object 302. The edge beam 304-E may be determined based on a sudden increase in a magnitude of a distance measurement collected by the sensor 308 (e.g., detecting a change in distance measured as a function of angle exceeding a threshold value), as illustrated in FIG. 6B below.

According to at least one non-limiting exemplary embodiment, a controller 118 may determine an edge 322 or corner of the object 302 using other sensor units 114 such as, for example, data from an imaging camera which captures and localizes the edge 322 of the object 302. The edge 322 of the surface may comprise a portion of the surface of the object 302 which is not visible to the robot 102 (e.g., due to line of sight or detection range of a sensor). One skilled in the art may appreciate that there may be a plurality of different methods for determining the edge 322 (e.g., using one or more imaging cameras), wherein determining the edge 322 using an edge beam 304-E is not intended to be limiting. Additionally, at block 418, the controller 118 may determine a location of a corner point 320, the corner point 320 defining a closest corner of the blind spot 318 to the route and a corner of the surface of the object 302, as illustrated above in FIGS. 3C-D and FIGS. 6A-B below.

Upon the controller 118 determining an edge 322 of the surface of the object 302 is detected, the controller 118 moves to block 416. In some embodiments, detection of a corner point 320 which does not move as the robot 102 travels along the route (e.g., due to an entire surface of the object 302 being localized, as illustrated in FIGS. 3C-D) may cause the controller 118 to move to block 416.

However, at block 414, upon the controller 118 determining the edge 322 of the surface of the object 302 or, in some embodiments, if a corner point 320 is not detected in a static location, the controller returns back to executing the step at block 410.

Block 416 illustrates the controller 118 mapping the blind spot 318 on a computer readable map. The mapped blind spot 318 may comprise the region occupied by the intersections 316 detected in block 412.

According to at least one non-limiting exemplary embodiment, the blind spot 318 may be mapped to a single point on the computer readable map, the point comprising an intersection 316 closest to the route between the edge beam 304-E and a virtual measurement 312 (e.g., corner point 320 illustrated in FIG. 3C above).

According to at least one non-limiting exemplary embodiment, a detected corner point 320 which detects a corner of an object 302 which causes blind spot 318 may be mapped onto the computer readable map to indicate a location of a blind spot 318. Similarly, in some non-limiting exemplary embodiments, point 326 along the route closest to a blind spot 318 and/or corner point 320 may be mapped onto the computer readable map to indicate a location of the blind spot 318.

According to at least one non-limiting exemplary embodiment, a controller 118 may continuously update a region encompassed by a blind spot 318 as a robot 102 moves along a route, wherein the controller 118 may not map a blind spot 318 as a fixed region on a computer readable map. Stated differently, the region corresponding to blind spot 318 on the computer readable map may be continuously updated as robot 102 travels along the route 306 or desired trajectory and collects sensor data along the way.

According to at least one non-limiting exemplary embodiment, block 416 may further include the controller 118 removing the virtual robots 310 to reduce a computational load imposed on the controller 118.

Block 418 illustrates the controller 118, at the distance L from the point 326, performing a safety action 324. The distance L may be a predetermined distance (e.g., 2 meters) or a distance based on speed, momentum, and/or stopping distance of the robot 102. The safety action 324 may include the controller 118 slowing down or stopping the robot 102 (e.g., reducing power to one or more actuator units 108), activating a noise emitting device (e.g., a speaker), activating a visual indicator (e.g., a light), and/or any similar action to alert nearby humans potentially within the blind spot 318 that the robot 102 is approaching the blind spot 318 or edge 322 of the object 302.

Advantageously, method 400 may enable a controller 118 of a robot 102 to detect, in real time, a blind spot 318 ahead of the robot 102. Detection of the blind spot 318 ahead of the robot 102 along a route may enable the controller 118 to provide ample time to perform the safety action. Further, the method 400 may enable the controller 118 to detect, localize, and map the blind spot 318 on a computer readable map of its environment without any prior localization data of objects within the environment.

Figure 5A:
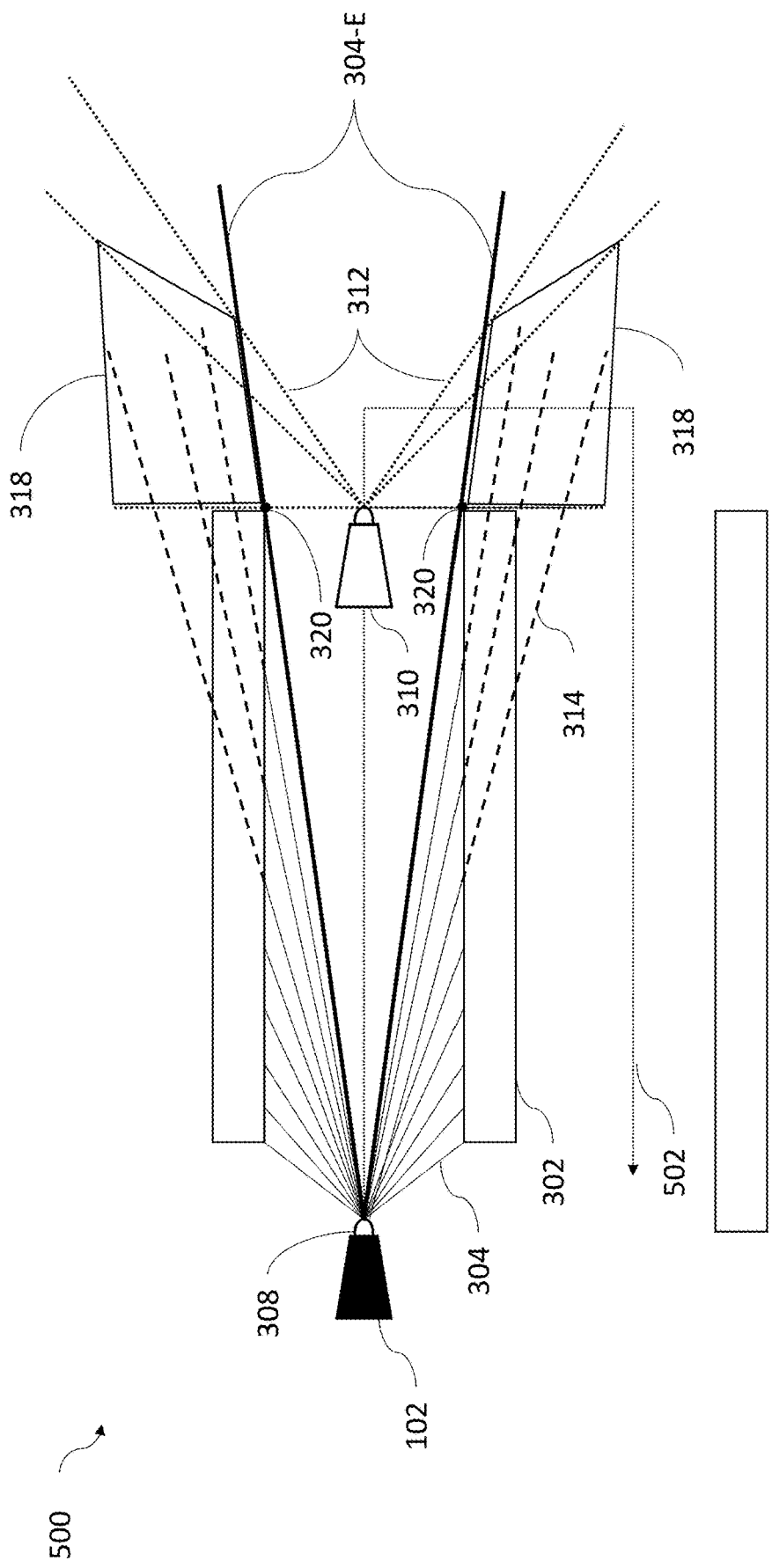
FIG. 5A illustrates a computer readable map of an environment comprising a plurality of obstacles which may generate blind spots to be determined by a robot, according to an exemplary embodiment.

FIG. 5A illustrates a computer readable map 500 of an environment comprising a robot 102, a plurality of objects 302, and route 502 for the robot 102 to follow, according to an exemplary embodiment. The robot 102 may be provided with the map 500 comprising locations of the objects 302 and the route 502, wherein the robot 102 may be required to determine locations of blind spots 318 to navigate the route 502 safely. Upon the robot 102 navigating along the route 502 and detecting objects 302 using a sensor 308, as illustrated by measurement beams 304, the robot 102 may project at least one virtual robot 310 ahead of itself along the route 502 to determine the locations of the blind spots 318. The single virtual robot 310 illustrated may be one of a plurality of virtual robots 310, wherein the other virtual robots 310 have been omitted for clarity. Following the method 400 illustrated in FIG. 4 above, a controller 118 of the robot 102 may determine locations of blind spots 318 based on intersections 316 (not shown) between extended beams 314 (illustrated by dashed lines) and an edge beams 302-E (bolded) intersecting with virtual measurements 312 (illustrated by dotted lines) from the virtual robot 310, wherein the virtual measurements 312 comprise simulated measurements from sensor 308 based on current localization data of the objects 302. Corner points 320 may additionally be defined as a corner of the objects 302 and a corner of the blind spot 318 closest to the route 502 as illustrated.

According to at least one non-limiting exemplary embodiment, a controller 118 of a robot 102 may determine locations of blind spots 318 on a computer readable map 500 virtually, wherein the controller 118 may simulate the robot 102 at its location illustrated in FIG. 5A to determine locations of blind spots 318 using a substantially similar method 400 by replacing the robot 102 with a virtual robot 310. Advantageously, determining the locations of the blind spots 318 virtually may enable the controller 118 to pre-compute the locations of the blind spots 318 without requiring the robot 102 to navigate through the environment (e.g., the robot 102 may be at a remote location far away from the locations of the blind spots 318).

Figure 5B:
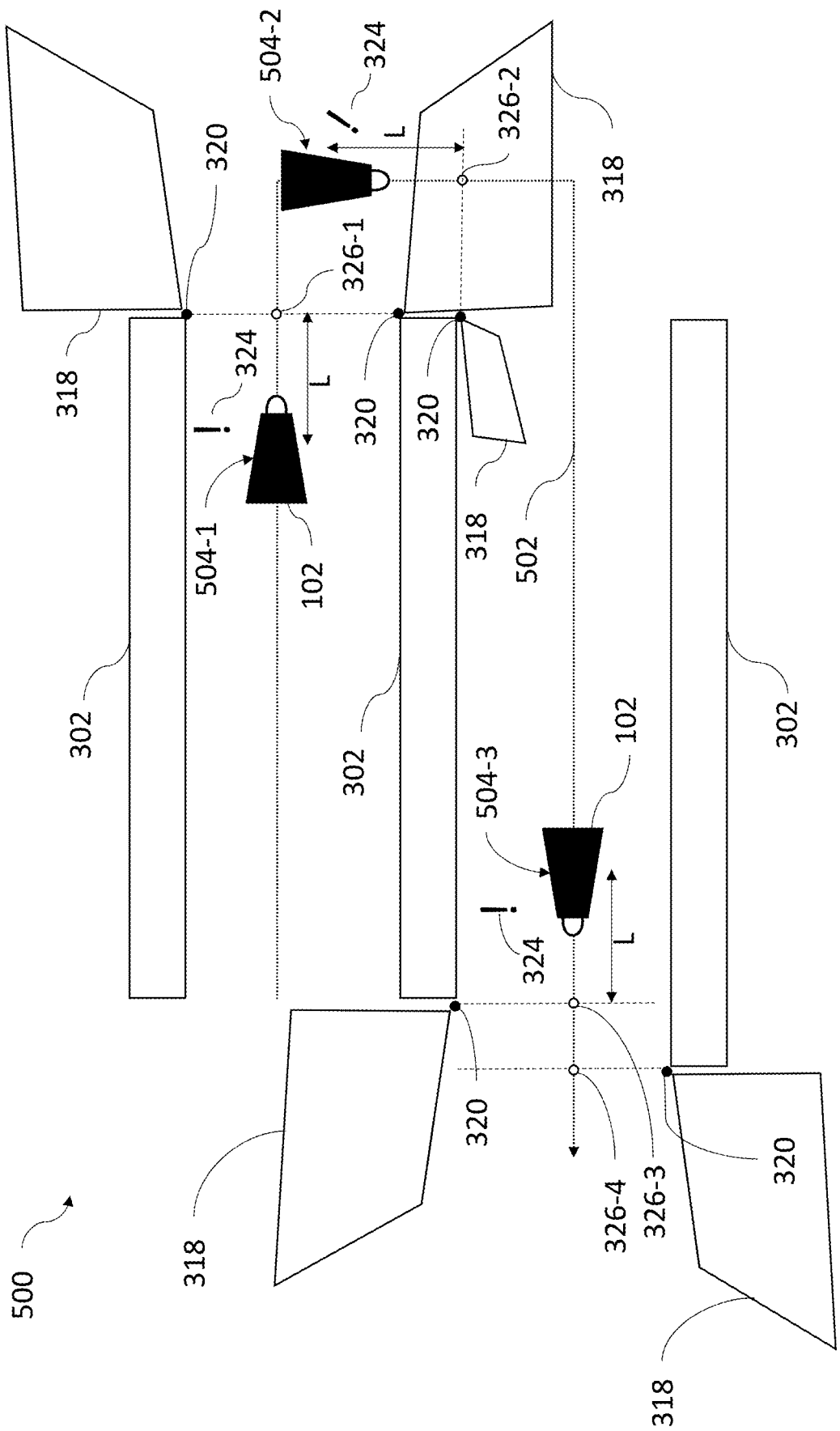
FIG. 5B illustrates a computer readable map comprising a plurality of obstacles and blind spots for a robot to consider while navigating along a route, according to an exemplary embodiment.

FIG. 5B illustrates a computer readable map 500 comprising a plurality of mapped blind spots 318 for a robot 102 to consider while navigating along a route 502, according to an exemplary embodiment. The plurality of mapped blind spots 318 may have been mapped during prior navigation of the route 502 by the robot 102 or precomputed by simulating a robot 102 (e.g., using a virtual robot 310) performing method 400 at locations along the route 502 on the map 500. In some embodiments, the blind spots 318 are detected in real time using method 400 above. As the robot 102 navigates along the route 502, the robot 102 may approach a distance L from a point 326, determined to be a closest point along the route 502 from a nearby blind spot 318 and/or corresponding corner point 320, as illustrated by dashed lines between the two points 320 and 326. Upon the robot 102 navigating the distance L from the points 326, the robot 102 may perform a safety action 324, illustrated by an exclamation mark, to alert nearby humans that the robot 102 is approaching blind spots 318 and/or to navigate beyond the blind spots 318 safely.

Additionally, FIG. 5B further illustrates the robot 102 at two positions, along the route 502 or two robots 102 at the two positions 504. At position, the robot 102 may be a distance L from the point. The arrow representing distance L is a presentative illustration that is not intended to be limiting. One skilled in the art would appreciate that distance L may represent distance taken from the front facing surface or proximal most end of the robot, the center of the robot, or the back facing surface or distal most end of the robot. At position, corner points 320 of the two surrounding objects 302 and/or blind spots 318 are at the same location along the route 502, thereby causing the robot 102 to perform a safety action 324 at the distance L from a single point. At a later time, the robot 102 may arrive at a second location at the predetermined distance L from a second point and perform another safety action 324, wherein the second point corresponds to another or a different blind spot 318 caused on a right side of the robot 102 (i.e., left of the point as illustrated) by an object 302. Later, when robot 102 is at a position, or a third location, however, the corner points 320 of the two surrounding objects 302 and/or another blind spot 318 may not be at the same location, or be spaced apart from each other along route traveled by robot 102, thereby causing two points and to be determined to be points along the route 502 closest, or proximate, to their corresponding corner point 320 or blind spot 318. As an additional safety measure, the robot 102 may be further configured to perform a safety action 324 at the distance L from the point and continue to perform the safety action 324 until the robot 102 navigates beyond the point (i.e., beyond both dashed lines), wherein the distance between the two points and are less than or equal to L. In turn, robot 102 continues to perform the safety action 324 until it travels past the fourth point.

According to at least one non-limiting exemplary embodiment, the safety action 324 may comprise of the robot 102 halting at a point 326 for a predetermined duration in time. According to at least one non-limiting exemplary embodiment, the safety action 324 may comprise at least one of the robot 102 emitting a noise, emitting a visual indication (e.g., a light), or changing of a speed of the robot 102.

Figure 6A:
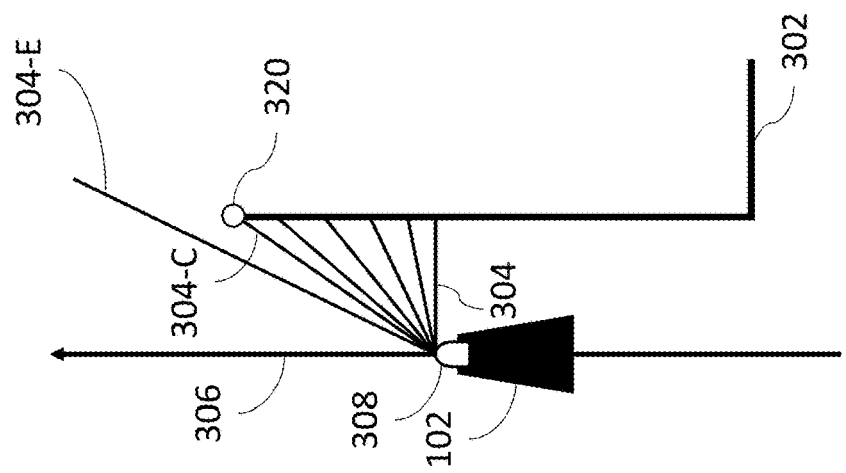

FIG. 6A illustrates a method for detecting a corner point 320 of an object 302, according to an exemplary embodiment. A robot 102, previously illustrated in FIG. 3A above, may navigate a route 306 and collect distance measurements using one or more beams 304, wherein the one or more beams 304 are emitted at discrete angles across a filed of view of the sensor 308. Edge beam 304-E may comprise a beam 304 which does not localize a surface of the object 302, wherein an adjacent beam 304 (e.g., to the left or right of edge beam 304-E) may localize the surface of the object 302. Accordingly, this beam 304 which localizes the surface of the object 302 and is adjacent to edge beam 304-E may localize a corner of the object 302 and will be denoted as a corner beam 304-C. Corner point 320 may therefore be determined to comprise a point where corner beam 304-C localizes the surface of the object 302. Edge beam 304-E may be detected based on the controller 118 of the robot 102 receiving a substantially large distance measurement from the edge beam 304-E directly adjacent to a substantially smaller distance measurement from an adjacent corner beam 304-C. That is, the derivative of distance measured by beams 304 with respect to angle θ at which the beams 304-C, 304-E are emitted exceeds a threshold value. It is appreciated that as the robot 102 navigates the route 306 more of the surface of the object 302 may be detected, as illustrated in FIGS. 3A-C, thereby causing corner point 320 to move (in this example, upwards) until a corner of the object 302 is detected wherein the corner point 320 will stop moving following this geometric method of detecting the corner point 320.

According to at least one non-limiting exemplary embodiment, edge beam 304-E may be determined based on the controller 118 not receiving a return measurement (i.e., a reflection of the edge beam 304-E) from the edge beam 304-E and receiving a return measurement from an adjacent measurement beam or corner beam 304-C as illustrated. For example, if the corner of the object 302 is detected by a first beam 304-C and an adjacent second beam 304-E does not return to a detector of the sensor 308, the second beam may be determined to comprise an edge beam 304-E.

FIG. 6B illustrates a measurement from a sensor 308 illustrated in FIG. 6A to further illustrate a method for detecting the edge beam 304-E and corner point 320, according to an exemplary embodiment. Graph 600 illustrates a portion of a field of view of the sensor 308 from 0° to 90°; however, the sensor 302 may comprise a different (e.g., smaller or larger) field of view. The graph 600 is illustrated using a dotted line to illustrate discrete beams 304 emitted from the sensor 308 each generating a discrete distance measurement. As illustrated within portion 602, a gradual increase in distance measured is observed roughly following a trigonometric sine relationship. This trend is observed until a sharp increase in distance is measured between angles $\theta_C$ and $\theta_E$ corresponding to respective angles at which beams 304-C and 304-E are emitted from the sensor 308. The angular separation between angles $\theta_C$ and $\theta_E$ may comprise an angular resolution of the sensor 308. This sharp increase may further yield a derivative of the distance measured with respect to angle $\theta$ exceeding a threshold value, thereby indicating an edge beam 304-E is emitted at angle $\theta_E$. Accordingly, an adjacent beam 304-C at angle $\theta_C$ may be determined to comprise a corner beam 304-C, wherein the corner beam 304-C localizes a corner point 320 of the object 302.

According to at least one non-limiting exemplary embodiment, portion 604 may not exist in the graph 600 due to no objects being present to measure distance therefrom. For example, if object 302 is the only object within an environment, distance measurements within portion 604 may not exist due to a lack of return signal (i.e., reflected beams 304) being received by the sensor 308. Edge beam 304-E may, in this embodiment, comprise a beam 304 emitted at an angle $\theta_E$, or a first angle at which no return signal is received, wherein the corner beam 304-C may be the beam 304 directly adjacent to the edge beam 304-E which still receives a distance measurement.

According to at least one non-limiting exemplary embodiment, a blind spot 318 may be detected using the graph 600. For example, corner point 320 may be determined based on a controller 118 of a robot 102 detecting a large increase in distance measured by a sensor 308 as a function of angle $\theta$. Corners of objects may cause blind spots for a robot 102, as illustrated in FIG. 3C above. Accordingly, detection of a corner point 320 may correspond to detection of a blind spot 318. Use of only detection of a corner point 320 to detect a blind spot is susceptible to false positive blind spot detection but may be beneficial for robots 102 comprising limited computational resources. In addition, if a robot 102 is desired to act conservatively (e.g., robot 102 operating in a crowded environment), false positive blind spot detection may be permissible for the robot 102 and further reduction in computational resources used to detect blind spots 318 may be beneficial.

FIG. 7 illustrates a method for detection of blind spots 318 similar to the methods illustrated above, according to an exemplary embodiment. A controller 118 of the robot 102 may collect measurements from any or all sensor units 114 to produce a computer readable map of an environment of the robot 102. Object 706 may comprise any object or surface of an object partially localized on the computer readable map. To detect a blind spot 318, a first circle 702 may be projected around the robot 102, wherein the first circle 702 only encompasses regions of the computer readable map beyond the object 702. That is, first circle 702 is illustrative of a plurality of extended measurements 314 across a 360° field of view of the robot 102 which extend beyond the object 706. A dashed line encompassing a remaining portion of the first circle 702 is illustrated, wherein only portion of the circle 702 shaded in grey (i.e., representative of regions out of line of sight from sensor units 114 of the robot 102 or regions beyond a localized surface the object 706) is considered for blind spot 318 detection. It is appreciated that if another object 706 is present (e.g., on the opposite side of the route 708), the first circle 702 may comprise a second region shaded in grey.

Next, a second circle 704 may encompass or be centered about a virtual robot 310 ahead of the robot 102 along the route 708. The second circle 704 may be of any size. In some embodiments, a radius of the second circle 704 is extended or increased until overlap with the first circle 702 is detected. In some embodiments, the radius of the second circle 704 is equal to a distance along the route 708 between the virtual robot 310 from the robot 102. The second circle 704 may be similarly illustrative of a plurality of virtual measurements 312 across a 360° field of view, as illustrated in FIGS. 3B-C above. The blind spot 318 may comprise of an overlap area between the two circles 702, 704, wherein corner point 320 may comprise a point of the blind spot 318 closest to the route 708. Accordingly, point 326, comprising a point along the route 708 closest to the blind spot 318, may be determined such that the robot 102, upon navigating up to a predetermined distance L from the point 326, may perform a safety action. Use of circles 702, 704 (i.e., generating a plurality of extended measurements 314 and virtual measurements 312 across a 360° field of view) may be advantageous for robots 102 which do not comprise distance measuring sensors 308 disposed on a front side of the robot 102, as illustrated in FIG. 3 (e.g., for robots 102 which generate computer readable maps using sensors on the sides of the robot 102).

One skilled in the art may appreciate that use of circles is intended for illustrative purposes and is not intended to be limiting. For example, the region 704 may be represented by a square region extending radially from the virtual robot 310, wherein the corner point 320 and point 326 may not change their position as illustrated using the circular or square region 704. As a second example, region 702 may encompass any or all regions which are not in line of sight of any sensor units 114 of the robot 102 due to object 706 and/or other objects, wherein this region 702 not in line of sight may be determined using other methods known in the art and/or disclosed herein (e.g., determining regions of a computer readable map occupied by extended measurements 314).

According to at least one non-limiting exemplary embodiment, the first circle 702 and second circle 704 may only encompass regions visible to or within a field of view of any sensor units 114 of the robot 102. The first circle 702 may still only comprise regions out of line of sight (i.e., beyond a localized surface of the object 706) which fall within a field of view of any sensor unit 114.

It will be recognized that while certain aspects of the disclosure are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various exemplary embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, non-recited elements or method steps; the term "having" should be interpreted as "having at least;" the term "such as" should be interpreted as "such as, without limitation;" the term 'includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure but instead as merely intended to highlight alternative or additional features that may or may not be utilized in a particular embodiment. Likewise, a group of items linked with the conjunction "and" should not be read as requiring that each and every one of those items be present in the grouping but rather should be read as "and/or" unless expressly stated otherwise. Similarly, a group of items linked with the conjunction "or" should not be read as requiring mutual exclusivity among that group but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

What is claimed is:

1. A non-transitory computer readable storage medium comprising a plurality of computer readable instructions stored thereon that when executed by at least one controller cause at least one controller to,
    project at least one virtual representation along a route traveled by a robot;
    collect, via the at least one virtual representation, a plurality of virtual measurements of an object based on current localization data of the object on a computer readable map; and
    determine, via the at least one virtual representation, a blind spot based on intersections between at least one extended measurement extending from the robot and at least one virtual measurement of the at least one virtual representation which does not detect the object; and
    perform a safety action upon navigating a predetermined distance from a point along a route proximate to the blind spot, the safety action comprising at least one of a visual indication, an auditory noise, a change of trajectory, or change of velocity of the robot.

2. The non-transitory computer readable storage medium of claim 1, wherein,
    the plurality of virtual measurements comprise virtual extensions of measurements extended beyond the object, and wherein at least one virtual measurement of the plurality of virtual measurements is used to determine the intersections, the intersections comprises at least one of the plurality of virtual measurements which do not detect the object based on the current localization data.

3. The non-transitory computer readable storage medium of claim 1, wherein the at least one controller is further configured to execute the computer readable instructions to,
    map the blind spot on the computer readable map upon detection of an edge of the object, wherein the edge of the object is a corner point and is proximate to the blind spot along the route traveled by the robot.

4. The non-transitory computer readable storage medium of claim 3, wherein the at least one controller is further configured to execute the computer readable instructions to,
    detect the corner point by detecting an edge beam, the edge beam being detected based on a change in distance measurement as a function of angle exceeding a threshold value, the corner point being of the object localized by a beam emitted adjacent to the edge beam.

5. The non-transitory computer readable storage medium of claim 1, wherein,
    the extended measurements are represented by a first region, the first region comprising portions of the computer readable map not in line of sight of any sensor coupled to the robot due to the object, the first region being centered about the robot;
    the virtual measurements are represented by a second region extending radially from each of the at least one virtual representation on the computer readable map; and the blind spot comprises a region of overlap between the first and second regions.

6. A system for detecting a blind spot, comprising:
a memory comprising a plurality of computer readable instructions stored thereon; and
at least one controller configured to execute the computer readable instructions to,
  project at least one virtual representation along a route traveled by a robot upon detection of an object by a sensor coupled to the robot,
  collect a plurality of virtual measurements of the object based on current localization data of the object on a computer readable map, and
  determine the blind spot based on intersections between at least one extended measurement from the sensor coupled to the robot and at least one virtual measurement of the at least one virtual representation which does not detect the object; and
  perform a safety action upon navigating a predetermined distance from a point along a route proximate to the blind spot, the safety action comprising at least one of a visual indication, an auditory noise, a change of trajectory, or change of velocity of the robot.

7. The robotic system of claim 6, wherein,
the at least one extended measurement comprises virtual extensions of measurements extended beyond the object, and wherein at least one virtual measurement of the plurality of virtual measurements is used to determine the intersections, the interactions comprises at least one of the plurality of virtual measurements which do not detect the object based on the current localization data.

8. The robotic system of claim 6, wherein the at least one controller is further configured to execute the plurality of computer readable instructions to,
map the blind spot on the computer readable map upon detection of an edge of the object, wherein the edge of the object is defined by a corner point and is proximate to the blind spot along the route traveled by the robot.

9. The robotic system of claim 8, wherein the at least one controller is further configured to execute the plurality of computer readable instructions to,
detect the corner point by detecting an edge beam, the edge beam being detected based on a change in distance measurement as a function of angle exceeding a threshold value, the corner point being of the object localized by a beam emitted adjacent to the edge beam.

10. The robotic system of claim 8, wherein,
the extended measurements are represented by a first region, the first region comprising portions of the computer readable map not in line of sight of any sensor coupled to the robot due to the object, the first region being centered about the robot;
the virtual measurements are represented by a second region extending radially from each of the at least one virtual representation on the computer readable map; and
the blind spot comprises a region of overlap between the first and second regions.

11. A method for detecting a blind spot, comprising:
projecting, by at least one controller coupled to a robot traveling along a route, at least one virtual representation along the route upon detection of an object by a sensor coupled to the robot, the at least one virtual representation being configured to collect a plurality of virtual measurements of the object based on current localization data of the object on a computer readable map; and
determining, by the at least one controller, the blind spot based on intersections between at least one extended measurement from the sensor and at least one virtual measurement of the at least one virtual representation which does not detect the object; and
performing a safety action upon navigating a predetermined distance from a point along a route proximate to the blind spot, the safety action comprising at least one of a visual indication, an auditory noise, a change of trajectory, or change of velocity of the robot.

12. The method of claim 11, wherein,
the extended measurements comprise virtual extensions of measurements extended beyond the object, and wherein at least one virtual measurement of the plurality of virtual measurements is used to determine the intersections, the intersections comprises at least one of the plurality of virtual measurements which do not detect the object based on the current localization data.

13. The method of claim 11, further comprising:
mapping the blind spot on the computer readable map upon detection of an edge of the object, the edge of the object being defined by a corner point and being proximate to the blind spot along the route traveled by the robot.

14. The method of claim 13, further comprising:
detecting the corner point by detecting an edge beam, the edge beam being detected based on a change in distance measurement as a function of angle exceeding a threshold value, the corner point being of the object localized by a beam emitted adjacent to the edge beam.

15. The method of claim 11, wherein,
the extended measurements are represented by a first region, the first region comprising portions of the computer readable map not in line of sight of any sensor coupled to the robot due to the object, the first region being centered about the robot;
the virtual measurements are represented by a second region extending radially from each of the at least one virtual representation on the computer readable map; and
the blind spot comprises a region of overlap between the first and second regions.

* * * * *